(12) United States Patent
Maruyama et al.

(10) Patent No.: US 11,201,834 B2
(45) Date of Patent: Dec. 14, 2021

(54) COMMUNICATION CONTROL DEVICE, COMMUNICATION CONTROL METHOD, AND COMMUNICATION SYSTEM

(71) Applicant: Hitachi, Ltd., Tokyo (JP)

(72) Inventors: Tatsuya Maruyama, Tokyo (JP); Noritaka Matsumoto, Tokyo (JP); Hidenori Oomiya, Tokyo (JP); Yuusaku Ootsuka, Tokyo (JP); Iori Kobayashi, Tokyo (JP); Toshiki Shimizu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/747,775

(22) Filed: Jan. 21, 2020

(65) Prior Publication Data
US 2020/0267094 A1 Aug. 20, 2020

(30) Foreign Application Priority Data
Feb. 14, 2019 (JP) .............................. JP2019-024376

(51) Int. Cl.
*H04L 12/911* (2013.01)
*H04L 12/24* (2006.01)
*H04L 12/917* (2013.01)
*H04L 29/08* (2006.01)
*G05B 13/02* (2006.01)

(52) U.S. Cl.
CPC ........ *H04L 47/781* (2013.01); *G05B 13/0265* (2013.01); *H04L 41/16* (2013.01); *H04L 47/76* (2013.01); *H04L 67/12* (2013.01); *H04L 67/2814* (2013.01)

(58) Field of Classification Search
CPC ...... H04W 72/048; H04L 47/76; H04L 41/16; H04L 67/2814; H04L 47/781; H04L 67/12; G05B 13/0265
See application file for complete search history.

(56) References Cited

U.S. PATENT DOCUMENTS

| | | | | |
|---|---|---|---|---|
| 10,979,297 B1* | 4/2021 | Franke | .................. | H04L 45/745 |
| 2009/0154407 A1* | 6/2009 | Jeong | .................... | H04W 48/08 |
| | | | | 370/329 |
| 2013/0203433 A1* | 8/2013 | Luna | .................. | H04L 41/5025 |
| | | | | 455/452.1 |
| 2013/0347104 A1* | 12/2013 | Raber | .................. | G06F 21/577 |
| | | | | 726/22 |
| 2016/0078368 A1* | 3/2016 | Kakhandiki | ........... | G06N 20/00 |
| | | | | 706/12 |
| 2016/0381116 A1* | 12/2016 | Hui | ........................ | H04L 67/04 |
| | | | | 455/425 |

(Continued)

FOREIGN PATENT DOCUMENTS

| | | |
|---|---|---|
| JP | 2017-184095 A | 10/2017 |
| JP | 2018-124852 A | 8/2018 |

OTHER PUBLICATIONS

Extended European Search Report received in Application No. EP 20156628.8 dated Jul. 7, 2020.

*Primary Examiner* — Abdullahi E Salad
(74) *Attorney, Agent, or Firm* — Mattingly & Malur, PC

(57) ABSTRACT

A communication control device of a communication system collects information of a first control device in a second control device via a relay device on a network. Allocation of network resources of the network is controlled based on a procedure of processing the collected information.

18 Claims, 19 Drawing Sheets

(56) References Cited

U.S. PATENT DOCUMENTS

| | | | |
|---|---|---|---|
| 2018/0218242 A1* | 8/2018 | Sekine | G06K 9/4628 |
| 2019/0174429 A1* | 6/2019 | Wang | H04W 52/54 |
| 2020/0022059 A1* | 1/2020 | Kamei | H04L 45/122 |
| 2020/0252957 A1* | 8/2020 | Cai | H04W 72/1289 |

* cited by examiner

COMMUNICATION CONTROL DEVICE, COMMUNICATION CONTROL METHOD, AND COMMUNICATION SYSTEM

CLAIM OF PRIORITY

The present application claims priority from Japanese application JP 2019-024376 filed on Feb. 14, 2019, the content of which is hereby incorporated by reference into this application.

BACKGROUND OF THE INVENTION

1. Field of the Invention

The present invention relates to a communication control device, a communication control method, and a communication system in various communication systems.

2. Description of the Related Art

As various communication systems, for example, a control computer may constitute a control system that controls a single or a plurality of control targets via a control network. In such a control system, an appropriate control network is selected and applied according to the application, requirements, and demands of the control system. From a technical point of view, as the demands of these control systems are increased, the technology of the control network has been developed. There are various demands for the control network such as a communication delay, cost reduction, the number of connections, accuracy of time synchronization, a connection distance, common use of communication media and communication data models, and redundant communication.

For example, a series of real-time Ethernets standardized by IEC 61784 is a typical example of the control network intended to be applied to the control system by defining functions for the control system with respect to an IEEE 802.3 method widely used in the IT field.

Similar to the real-time Ethernet, a communication method constituted by a series of IEEE standards called Time Sensitive Network (TSN) is a control network in which the IEEE 802.3 standard can be applied to the control system.

These control networks based on IEEE 802.3 have technical advantages such as a wider communication band than the control network of the related art.

Meanwhile, in the IT field, a method of flexibly changing the network constitution and implementation thereof have been utilized like Software Defined Network (SDN). In the SDN, it is possible to flexibly change a path control method of a communication packet in the corresponding relay device, and it is possible to contribute to the realization of a constitution of a new IT system such as a cloud.

As the technology has been advanced, the demands on the control system in the control network have been increased. In the related art, the improvement of control communication performance with the control target has been aimed, but these demands are not limited to the communication performance in recent years. For example, there are purposes such as asset management through the application of AI to the control system or the application of Condition Based Maintenance (CBM) through communication of maintenance data due to the advancement of an AI technology that mainly performs deep learning.

The requirements of communication necessary to realize these purposes are different from the control communication of the related art, and can be dynamically changed depending on a state.

From these viewpoints, for example, in JP 2018-124852 A, an "information processing device that includes discrimination unit that discriminates a state of an observation target by using learning results based on sensor information received from a plurality of sensor terminals, and a transmission control model construction unit that decides whether or not to transmit the sensor information for each sensor terminal based on communication cost of the sensor information and discrimination accuracy of the discrimination unit, in which the discrimination unit discriminates the state of the observation target based on the sensor information transmitted based on whether or not to transmit decided by the transmission control model constitution unit" is provided, and thus, it is possible to reduce the communication cost of the sensor information while maintaining the discrimination accuracy.

In JP 2017-184095 A, a "communication relay device that relays communication between a local area network and an external network includes a LAN interface unit that serves as an interface for the local area network, a WAN interface unit that serves as an interface for the external network, a communication data control unit that is provided between the LAN interface unit and the WAN interface unit to perform band control processing for controlling a band of the communication, a content data analysis unit that monitors communication data transmitted and received in the communication and performs content analysis processing for enabling a band limitation inquiry flag to be in a valid state when the communication data is a preset type of data, a storage unit that stores at least band limitation rate information indicating a band limitation rate that defines a communication rate at the time of limiting a band of the communication and a band limitation management table including a band limitation configuration value that defines a band limitation state of the communication for each communication destination server provided in the external network, and a system control unit that performs band limitation processing for instructing the communication data control unit to perform communication processing related to limitation target communication data at a communication rate defined in the band limitation rate information when a band limitation configuration value of a communication destination server as a transmission and reception partner of limitation target communication data which the communication data in which the band limitation inquiry flag is in the valid state is valid while referring to the band limitation management table based on the fact that the band limitation inquiry flag is in the valid state" is provided, and thus, useless communication in the communication relay device is reduced.

SUMMARY OF THE INVENTION

However, since the control communication of the related art mainly has a static network constitution, there is a problem that the utilization efficiency of the network resources is low depending on a change of the state. It is difficult to satisfy the requirements for the control communication of the related art (for example, ensuring of the maximum communication delay such as real-time performance).

In this regard, JP 2018-124852 A decides whether or not to transmit the sensor information based on the communication cost of the sensor information and the discrimination accuracy. However, since the network resources between the control computer and the sensor are not controlled, it is difficult to satisfy the requirements for control communication.

JP 2017-184095 A is an invention of the relay device that performs communication based on the band limitation rate information configured for the communication destination server when the communication data is the preset type of data. However, since the network constitution is based on the static configuration, it is difficult to apply to the control system in which the state can be dynamically changed.

In view of such circumstances, an object of the present invention is to provide a communication control device, a communication control method, and a communication system capable of constituting a control system having excellent utilization efficiency for network resources of a control network.

As described above, the present invention provides a "communication control device of a communication system that collects information of a first control device in a second control device via a relay device on a network, in which allocation of network resources of the network is controlled based on a procedure of processing the collected information".

The present invention provides a "communication system including a first control device, a relay device that relays information of the first control device on a network, a second control device that collects the information of the first control device via the relay device, and a communication control device that controls allocation of network resources of the network based on a procedure of processing the collected information".

The present invention provides a "communication control method of a communication system that collects information of a first control device in a second control device via a relay device on a network, and the method includes controlling allocation of network resources of the network based on a procedure of processing the collected information".

According to the present invention, it is possible to provide a control system with excellent utilization efficiency for network resources of a control network.

DESCRIPTION OF THE PREFERRED EMBODIMENTS

Hereinafter, the present invention will be described in detail with reference to the drawings.

Since a communication control device and a communication control method in a communication system according to the present invention and technical contents of the communication system are diverse, the communication system, a hardware constitution of the communication control device, and functions thereof will be mainly described in a first embodiment, and the communication control method will be described in a second embodiment.

The present invention can be summarized as follows. Since "a communication control device in a communication system that collects information of a first control device in a second control device via a relay device on a network, in which allocation of network resources of the network is controlled based on a procedure of processing the collected information", the network resources of the network will be described in detail in a third embodiment, and a condition for controlling the allocation of the network resources in a procedure of processing the collected information will be described in a fourth embodiment.

In particular, utilization of surplus resources as various matters accompanying the present invention will be described in a fifth embodiment.

First Embodiment

In the first embodiment, the communication system and the hardware constitution and functions of the communication control device thereof will be mainly described with reference to FIGS. 1 to 9.

Figure 1:
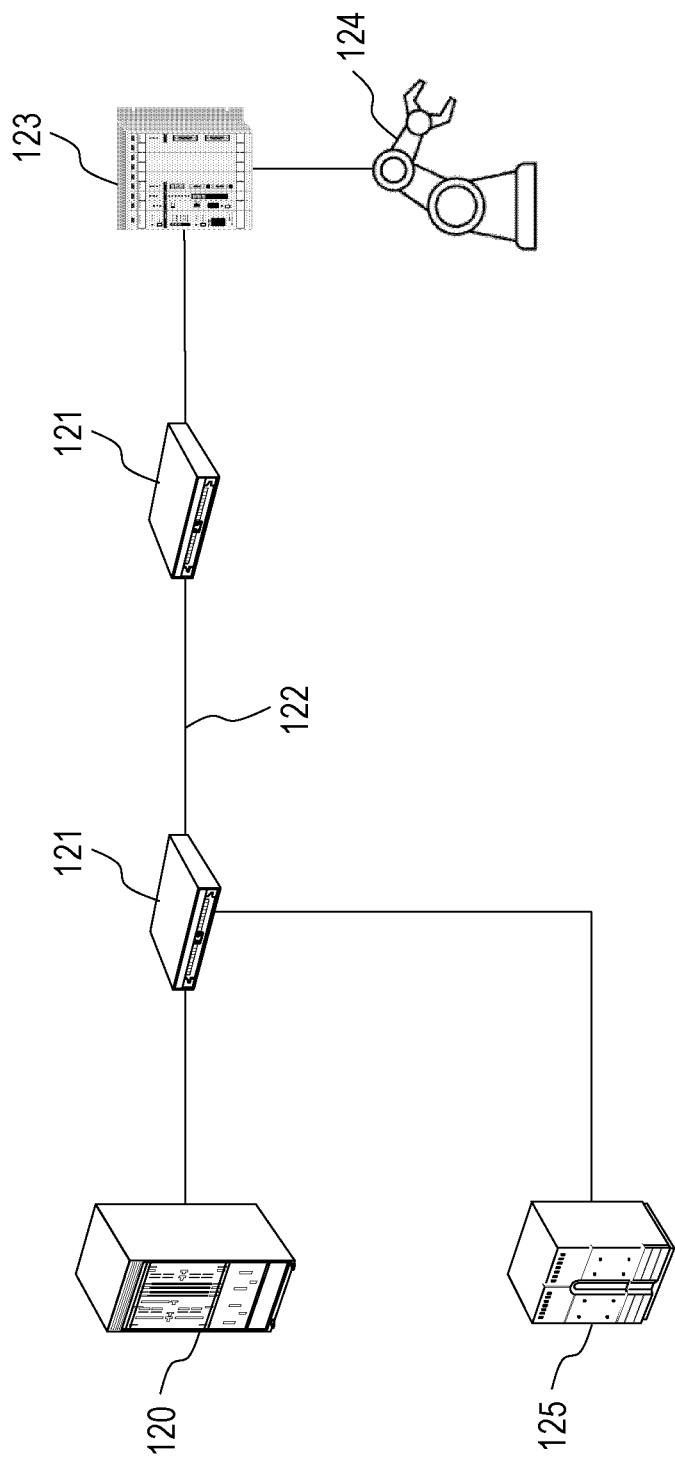
FIG. 1 is a diagram illustrating a constitutional example of a communication system to which the present invention is applied.

FIG. 1 illustrates a constitution example of a typical communication system to which the communication control device and the communication control method according to the present invention are applied.

In the typical communication system illustrated in FIG. 1, a central control device 120 is connected to and communicates with a distributed control device 123 via a control network 122 and network relay devices 121. For example, the distributed control device 123 controls a controlled device 124 such as a robot.

For example, in the communication system having the aforementioned constitution, a network resource control device 125 to which the communication control device and the communication control method according to the present invention are applied acts on the network relay device 121, and variably adjusts the network resources. Although the details will be described in the third embodiment, the network resources mentioned herein include a communication band, a time width in a time-division communication method, configuration of a priority for a specific communication type, and the number of communication paths to be used.

Hereinafter, constitutions, processing functions, and contents of the devices in FIG. 1 will be described in more detail.

First, the central control device 120 performs transmission of a control command value for controlling the controlled device 124, acquisition of a measurement value of the controlled device 124, and various configurations by transmitting and receiving communication packets to and from the distributed control device 123.

An example in which the central control device 120 transmits and receives sampling data, control commands, and state signals in each control system, such as a central control device of a distributed control system (DCS) and a protection control device of a power system is illustrated. Data in the same control system may be stored in the packet.

Examples of the central control device 120 include a dedicated controller, an industrial personal computer, a control computer, a DCS controller, a Supervisory Control and Data Acquisition (SCADA) server, a Programmable Logic Controller (PLC), an Intelligent Electronic Device (IED), a protection control device, a cloud, and a server.

The network relay device 121 is a relay device in the control network 122, and transfers packets by controlling paths of packets communicated by the central control device 120, the distributed control device 123, and the network relay device 121. Examples of the network relay device 121 include various network repeaters such as a network switch including an L2 switch and an L3 switch, a bridge, a router, a Transparent Clock (TC) of IEEE 1588, a Boundary Clock (BC), an OpenFlow switch, RedBox defined in IEC 62439-3, QuadBox, an optical switch, an optical multiplexer, and an optical splitter.

The control network 122 is a network that connects the central control device 120, the distributed control device 123, and the network relay device 121 to each other, and includes, for example, IEEE 802.3 (Ethernet), IEC 61784, Communication Profile Family 12 (hereinafter, referred to as EtherCAT (registered trademark)) of IEC 61784-2, various industrial networks including control networks defined by IEC 61158, IEEE communication standard groups related to TSN, Distributed Network Protocol (DNP)3, IEC 61970, High availability Seamless Redundancy (HSR) and Parallel Redundancy Protocol (PRP) of IEC 62439-3, ring networks, RPR method of IEEE 802.17, Controller Area Network (CAN (registered trademark)), DeviceNet, RS-232C, RS-422, RS-485, ZigBee (registered trademark), Bluetooth (Registered trademark), IEEE 802.15, IEEE 802.1, mobile communication, OpenADR, ECHONET Lite (registered trademark), and OpenFlow (registered trademark).

Examples of a higher protocol in a protocol stack include IEC 61850, OPC Unified Architecture (UA), IEC 61850-7-420, and IEC 60870-5-104. Alternatively, the aforementioned protocols may be hierarchized. For example, the OPC UA standard is applied as the content of a data area on TSN.

The distributed control device 123 is connected to the controlled device 124, and controls and configures the controlled device 124 according to the control command received from the central control device 120 via the control network 122. The distributed control device acquires a state and information of the controlled device 124, and transmits the acquired state and information of the controlled device to the central control device 120 via the control network 122.

Examples of the distributed control device 123 include a dedicated controller, an industrial personal computer, a control computer, a DCS controller, a SCADA device, a PLC, an IED, a Merging Unit (MU), and a protection control device.

The controlled device 124 is equipment or a device controlled by the distributed control device 123. Examples of the controlled device 124 include industrial robots such as mobile robots and robot arms, chip mounters, machine tool tables, processing devices, machine tools, semiconductor manufacturing devices, motors in manufacturing devices, inverters, and power devices such as circuit breakers and disconnectors.

The network resource control device 125 which is the communication control device according to the present invention controls network resources involved in communications of the central control device 120, the network relay device 121, and the distributed control device 123. Examples of the network resources include a communication band, a time width in a time-division communication method, configuration of a priority for a specific communication type, and the number of communication paths to be used.

The network resource control device 125 can acquire states of the central control device 120, the network relay device 121, and the distributed control device 123 by communicating with the central control device 120, the network relay device 121, and the distributed control device 123.

Examples of the network resource control device 125 include the communication control device such as an OpenFlow control device in SDN and a dedicated communication device.

Although two network relay devices 121 are connected between the central control device 120 and the distributed control device 123 in FIG. 1, different numbers of network relay devices may be used, and a plurality of communication paths may be used.

Examples of the system constitution illustrated in FIG. 1 include control systems such as Factory Automation (FA) and Process Automation (PA) for DCS, monitoring and protection control systems in the power field, industrial equipment, semiconductor manufacturing devices, in-vehicle systems, control systems within construction machines and railway vehicles, railway ground signal systems, and control systems in aircraft. Alternatively, examples of the system constitution include an IoT system that improves performance of the control system by performing analysis through artificial intelligence on the central control device 120, a cloud, or a computer (not illustrated) based on the information collected via the control network 122.

Figure 2:
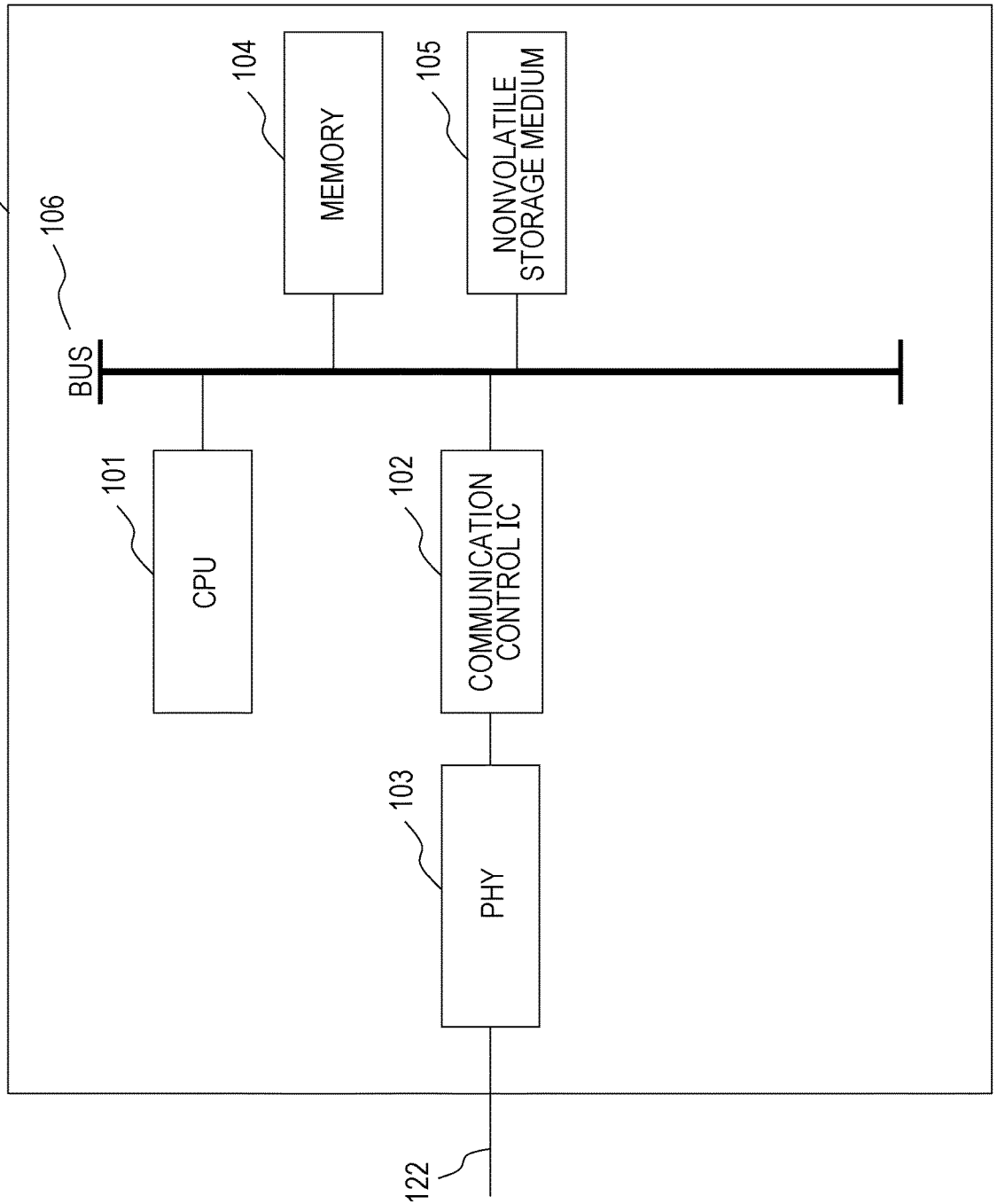
FIG. 2 is a diagram illustrating a hardware constitutional example of a central control device in FIG. 1.

FIG. 2 illustrates a hardware constitutional example of the central control device 120.

A CPU 101 in the central control device 120 transfers a program from a nonvolatile storage medium 105 to a memory 104 and executes the program. Examples of an execution processing program include an operating system (hereinafter, referred to as an OS) and an application program running on the OS. The program running on the CPU 101 acquires operation configurations and state information of a communication control IC 102.

The communication control IC 102 receives a transmission request and transmission data from software running on the CPU 101, and transmits the received transmission request and transmission data to the control network 122 by using a PHY 103. Data received from the control network 122 is transferred to the CPU 101, the memory 104, and the nonvolatile storage medium 105 via a bus 106.

Implementation examples of the communication control IC 102 include ICs such as Field Programmable Gate Array (FPGA), Complex Programmable Logic Device (CPLD), Application Specific Integrated Circuit (ASIC), and gate array. Alternatively, the communication control IC and CPU 101 may be integrated. The communication control IC 102 may be an IEEE 802.3 communication device including a MAC layer and a PHY layer, or a PHY function may be included in the communication control IC 102. In this case, the implementation examples of the communication control IC 102 include a Media Access Control (MAC) chip, a physical layer (PHY) chip, and a combined chip of MAC and PHY conformable to the IEEE 802.3 standard. The communication control IC 102 may be included in the CPU 101 or a chipset that controls an information path within a computer. Although one communication control IC 102 is illustrated in the constitution of FIG. 2, a plurality of communication control ICs 102 may be provided.

The PHY 103 is a transceiver IC having a function of communicating with the control network 122. An IEEE 802.3 physical layer (PHY) chip is used as a communication standard provided by the PHY 103. In the constitution of FIG. 2, since the PHY 103 and the communication control IC 102 are connected, processing of a Media Access Control (MAC) layer of IEEE 802.3 is included in the communication control IC 102. Here, the effects of the present invention are also achieved in a constitution in which an IC that provides a MAC function is disposed between the communication control IC 102 and the PHY 103 or in a constitution in which a communication IC obtained by combining the PHY 103 and the IC that provides the MAC function and the communication control IC 102 are connected. The PHY 103 may be included in the communication control IC 102. Although one PHY 103 is illustrated in the constitution of FIG. 2, a plurality of PHYs 103 may be provided.

The memory 104 is a temporary storage area in which the CPU 101 operates, and stores the OS and the application program transferred from the nonvolatile storage medium 105.

The nonvolatile storage medium 105 is an information storage medium, and is used to store an OS, an application, a device driver, a program for operating the CPU 101, and an execution result of the program. Examples of the nonvolatile storage medium 105 include a hard disk drive (HDD), a solid-state drive (SSD), and a flash memory. A floppy disk (FD), CD, DVD, Blu-ray (registered trademark), USB memory, and CompactFlash (registered trademark) are used as an external storage medium that can be easily detached.

The bus 106 connects the CPU 101, the communication control IC 102, the memory 104, and the nonvolatile storage medium 105 to each other. Examples of the bus 106 include a PCI bus, an ISA bus, a PCI Express bus, a system bus, and a memory bus.

Figure 3:
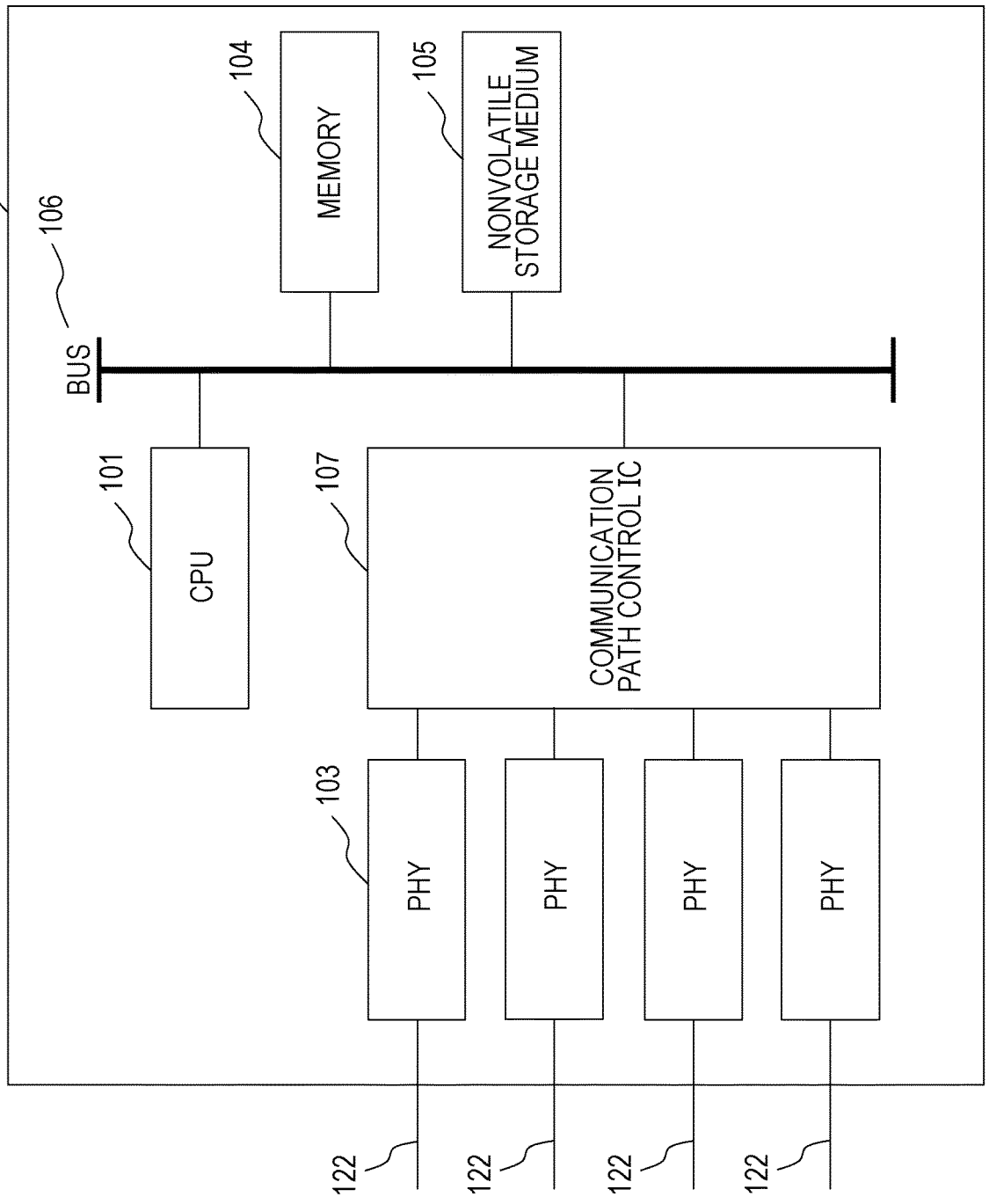
FIG. 3 is a diagram illustrating a hardware constitutional example of a network relay device in FIG. 1.

FIG. 3 illustrates a hardware constitutional example of the network relay device 121.

A communication path control IC 107 within the network relay device 121 is connected to one or a plurality of PHYs 103 and a bus 106, and executes communication path control such as transfer processing of the received packet. The communication path control IC 107 may be connected to the bus 106, and may be connected to the communication control IC 102 (not illustrated) via the bus 106. The implementation examples of the communication path control IC 107 include ICs such as FPGA, CPLD, ASIC, or gate array. The communication path control IC 107 may be included in a CPU 101 or a chipset that controls an information path within a computer.

Figure 4:
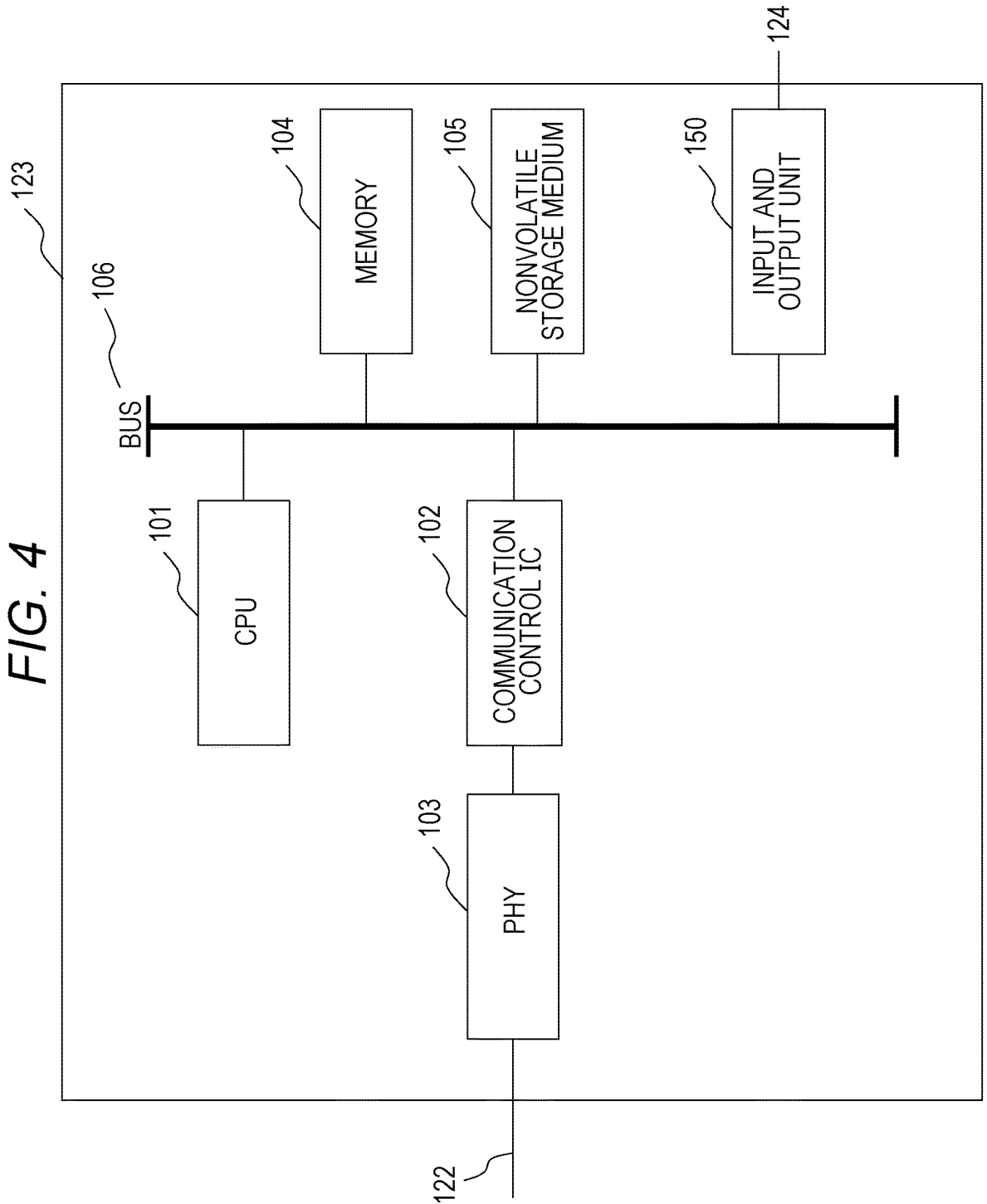
FIG. 4 is a diagram illustrating a hardware constitutional example of a distributed control device in FIG. 1.

FIG. 4 illustrates a hardware constitutional example of the distributed control device 123.

An input and output unit 150 within the distributed control device 123 is an input and output interface for controlling the controlled device 124 or acquiring information of the controlled device 124.

Examples of the input and output unit 150 include various digital input and output and analog input and output ICs. Although one signal line from the input and output unit 150 is illustrated, a plurality of signal lines may be used depending on the constitution of the controlled device 124.

Although not illustrated in the drawings, a hardware constitution of the network resource control device 125 is the same as the constitution illustrated in FIG. 2.

Figure 5:
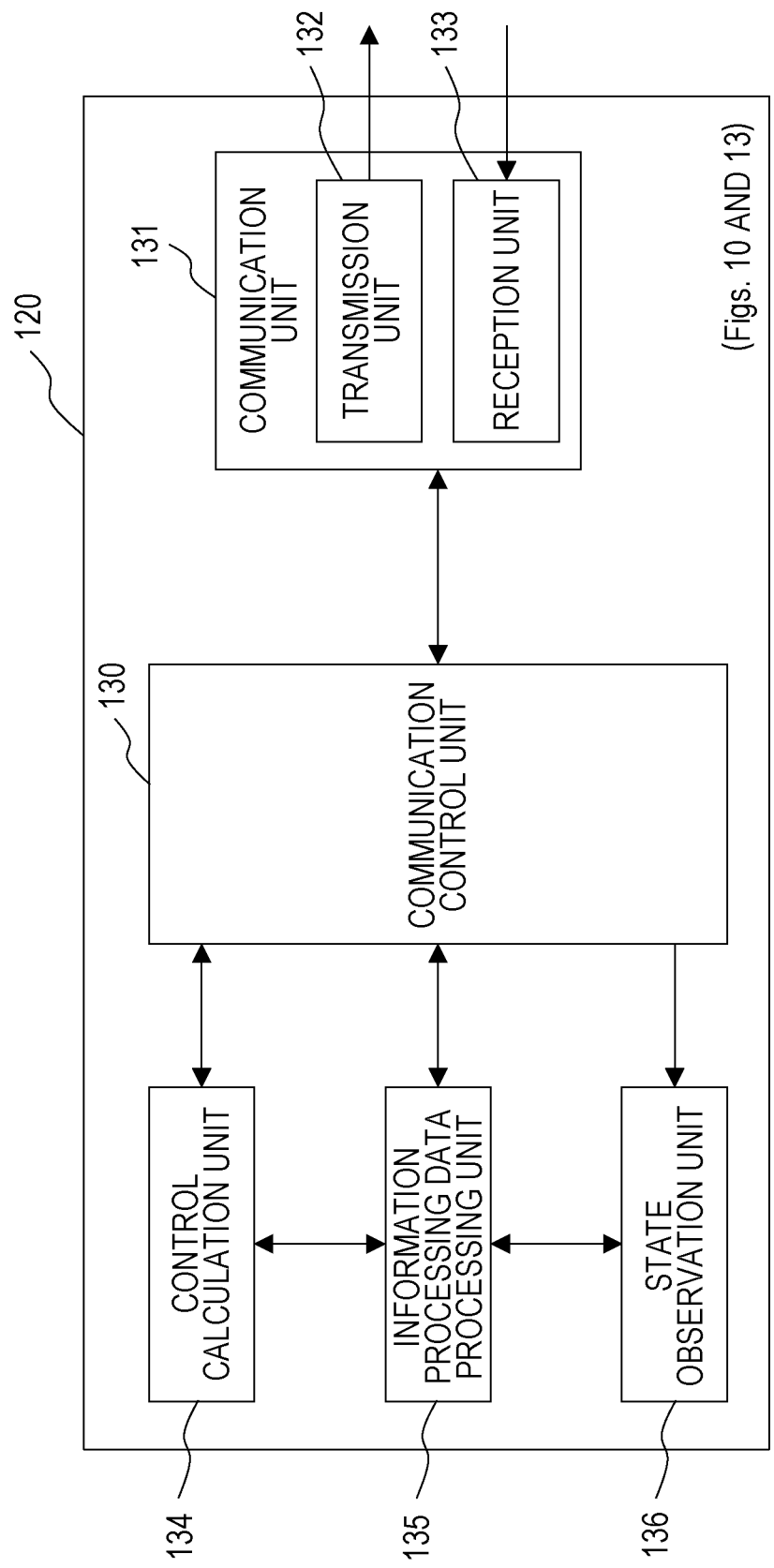
FIG. 5 is a diagram illustrating a functional constitutional example of the central control device in FIG. 1.

Next, functional constitutions of the devices of FIG. 1 will be described. First, FIG. 5 illustrates a functional constitutional example of the central control device 120.

A communication control unit 130 within the central control device 120 transmits transmission contents from the connected functional unit to a communication unit 131. Priority control, combination and duplication of transmission contents, and control of a transmission timing can be executed for transmission requests from a plurality of functional units. Alternatively, formatting and addition of parameters can be executed according to the specification of the control network 122 to which the communication unit 131 is connected.

Alternatively, when a single or a plurality of communication units 131 is connected, one or a plurality of communication units 131 that transfers the transmission contents can be selected. Different parameters may be assigned to the communication units 131 as transfer destinations.

The communication control unit 130 transfers the content received by the connected communication unit 131 to the functional unit. Priority control of an acquisition order, duplication and decomposition of reception contents, and control of reception timings can be executed for the contents received from the plurality of communication units 131.

Alternatively, formatting and removal of parameters can be performed according to the specification of the control network 122 to which the communication unit 131 is connected.

The communication control unit 130 includes any one or both of hardware such as the communication control IC 102, the PHY 103, and a dedicated IC used for a switch, a router, or a network device, and software such as a TCP/IP protocol stack or network processing middleware.

The communication unit 131 is a functional unit that is connected to the control network 122, and performs communication according to a communication protocol of the control network 122. The communication unit includes one or a plurality of software running on the CPU 101, the communication control IC 102, and the PHY 103.

The transmission unit 132 is a functional unit that is connected to the PHY 103, processes the data or packet notified from the bus 106, and transmits the processed data or packet to the PHY 103. Examples of the processing of the transmission unit 132 include processing for generating a frame from the data, duplication of the data or packet, addition of a predetermined tag, and calculation and addition of abnormality diagnosis data such as CRC.

Examples of the tag added by the transmission unit 132 include VLAN tags defined by IEEE 802.1Q, HSR tags defined by IEC 62439-3, and PRP tags. The configuration of the VLAN tag includes configuration of Priority Code Point (PCP) and VLAN Identifier (VID).

The transmission unit 132 has the MAC function, and includes one or a plurality of software running on the CPU 101 and the communication control IC 102.

The reception unit 133 transfers the received packet to the communication control unit 130. The reception unit 133 may process the received packet, and examples of the processing include removal of the tag added to the packet and extraction of the data. The reception unit 133 may include information storage means for storing information of the processed packet for a predetermined period, and may store, for example, information on a transmission source address or a tag.

The implementation examples of the reception unit 133 include any one or a plurality of the communication control IC 102, the PHY 103, or the software on the CPU 101.

A control calculation unit 134 calculates a command value necessary for the distributed control device 123 to control the controlled device 124. The control calculation unit may calculate a command value for directly controlling the controlled device 124. Specifically, the control calculation unit may calculate a target value necessary for the distributed control device 123 to control the controlled device 124. Information received from the distributed control device 123 may be used for calculating these command values. This received information includes the state signal of the controlled device 124.

Examples of the control calculation unit 134 include the CPU 101 and software executed on the CPU 101.

An information processing data processing unit 135 is a functional unit that mainly processes information related to the controlled device 124 acquired from the distributed control device 123 for a specific purpose. For example, the information processing data processing unit has control of the controlled device 124 in the distributed control device 123, an AI function of processing the state information, and a maintenance function such as preventive maintenance, CBM, and remaining life prediction. Information (control command values and model constants for feedback control) for improving and advancing control calculations executed by the controlled device 124 and execution instructions for maintenance by an operator are used as outputs of the information processing data processing unit 135.

Examples of the information processing data processing unit 135 include the CPU 101 and software executed on the CPU 101.

Although the control calculation unit 134 and the information processing data processing unit 135 are separately illustrated in FIG. 5, the control calculation unit and the information processing data processing unit may be provided as one unit. Alternatively, a plurality of central control devices 120 may be provided, and the control calculation unit 134 and the information processing data processing unit 135 may operate on different central control devices 120.

A state observation unit 136 observes a state of a processing procedure of information processing data in the information processing data processing unit 135. The state to be observed may be identified by using a predefined step of the processing procedure. Examples of the observation of the state include events such as completion of predetermined processing and construction of a model of the control device as a target. Alternatively, the observation of the state may be performed by using a value of a single or a plurality of indices and variables which define the processing procedure. For example, the observation of the state may be performed by using a value of an error function in AI learning. Alternatively, the processing procedure may be represented by a state machine, and may be represented by an identifier of each state.

The state observation unit 136 transmits the observed state to a network resource allocation control unit 160 of the network resource control device 125.

Examples of the state observation unit 136 include the CPU 101 and software executed on the CPU 101.

Figure 6:
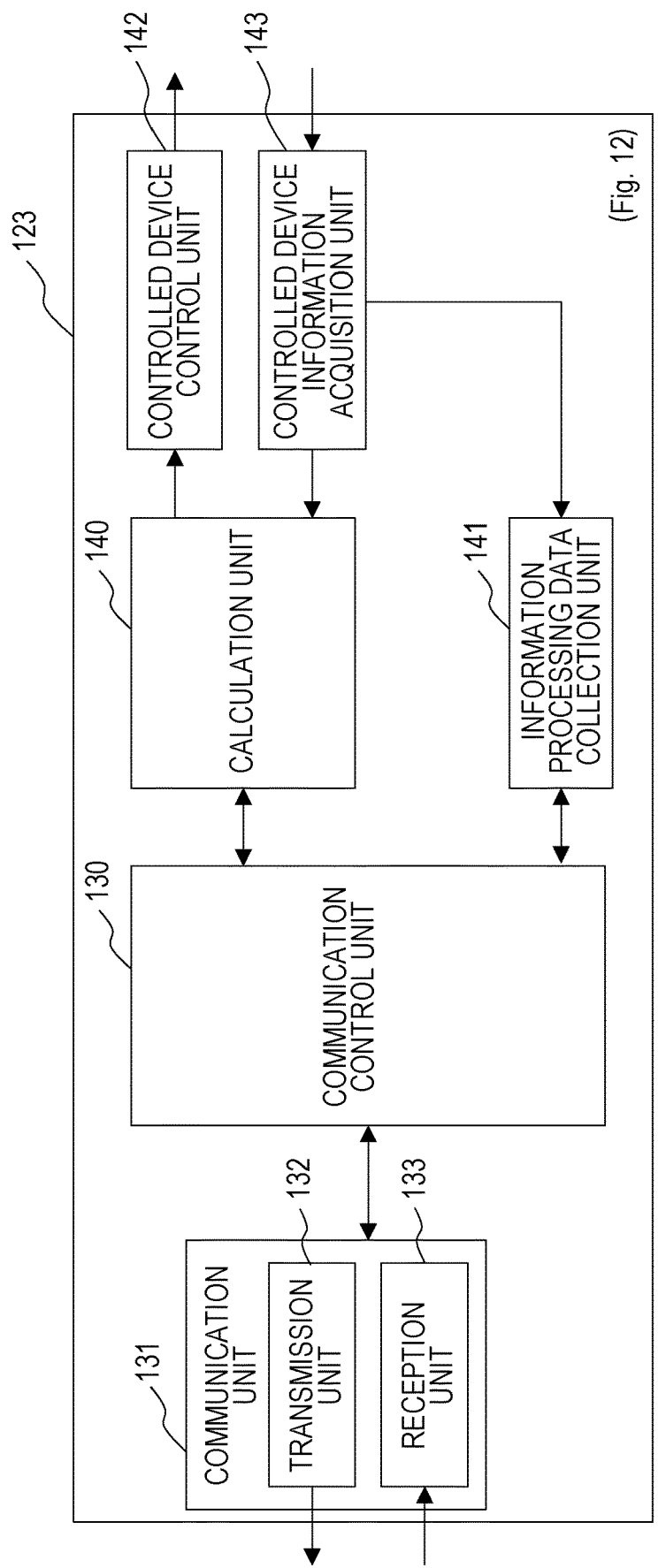
FIG. 6 is a diagram illustrating a functional constitutional example of the distributed control device in FIG. 1.

FIG. 6 illustrates a functional constitutional example of the distributed control device 123.

A calculation unit 140 controls the controlled device 124 via a controlled device control unit 142 based on the control command received from the central control device 120. The calculation unit 140 may control the controlled device 124 by using the control command from the control calculation unit 134 with no change, or may perform fine control by using the control command value from the control calculation unit 134 as the target value. For example, a speed of the controlled device 124 may be controlled by the calculation unit 140 by using the control command value from the control calculation unit 134 as a position target value.

Alternatively, the calculation unit acquires the state of the controlled device 124 via a controlled device information acquisition unit 143, and transmits the acquired state of the controlled control device to the central control device 120.

The implementation examples of the calculation unit 140 include the CPU 101, the software executed on the CPU 101, or a dedicated IC.

An information processing data collection unit 141 acquires the information processing data used by the information processing data processing unit 135 from the calculation unit 140 or the controlled device information acquisition unit 143, and transmits the acquired information processing data to the information processing data processing unit 135.

The implementation examples of the information processing data collection unit 141 include the CPU 101, software executed on the CPU 101, or a dedicated IC.

The controlled device control unit 142 receives the control command from the calculation unit 140, and controls the controlled device 124 based on the control command.

The implementation examples of the controlled device control unit 142 include the CPU 101, software executed on the CPU 101, or the input and output unit 150.

The controlled device information acquisition unit 143 monitors the state of the controlled device 124, and transmits the monitored state to the calculation unit 140 and the information processing data collection unit 141. A timing of the transmission may be a predetermined regular interval, or may be a timing when the state of the controlled device 124 is changed or a timing when a request from the calculation unit 140 or the information processing data collection unit 141 is received.

The implementation examples of the controlled device information acquisition unit 143 include the CPU 101, software executed on the CPU 101, or the input and output unit 150.

Figure 7:
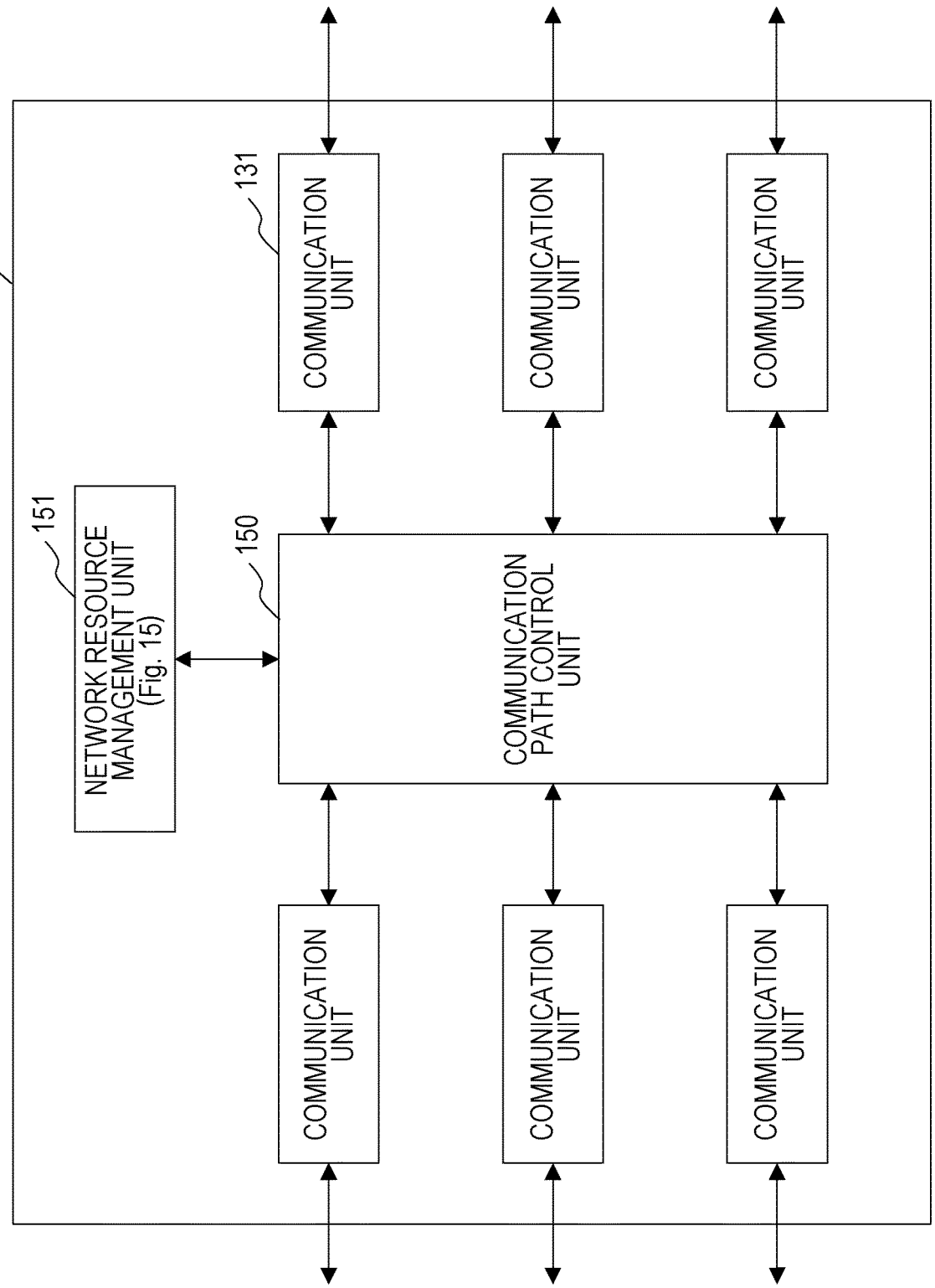
FIG. 7 is a diagram illustrating a functional constitutional example of the network relay device in FIG. 1.

FIG. 7 illustrates a functional constitutional example of the network relay device 121.

A communication path control unit 150 is connected to a plurality of communication units 131, receives a packet through each communication unit 131, decides the communication unit 131 which is a transfer destination of the received packet based on information on the received packet and information configured for the communication path control unit 150, and controls a path of the received packet.

A timing when the packet is transmitted to the communication unit 131 as the transfer destination may be a timing immediately after the transfer destination is decided, may be a timing when a priority is controlled among a plurality of packets waiting to be transferred, or may be every predetermined time slot in the time-division communication method. IEEE 801.1Qbv is used as an example of communication of the time-division communication method.

The implementation examples of the communication path control unit 150 include the CPU 101, software executed on the CPU 101, and an IC such as FPGA, CPLD, ASIC, or gate array. The communication path control unit 150 may be included in the CPU 101 or a chipset that controls an information path within a computer. A function necessary for communication may be incorporated depending on the constitution of the communication unit 131. For example, when the communication unit 131 has a function corresponding to the physical (PHY) layer, the communication path control unit 150 has a function corresponding to the MAC layer.

A network resource management unit 151 manages utilization states and allocation states of the network resources in the communication path control unit 150 and the single or plurality of communication units 131, and controls the network resources in the network relay device 121 based on a predetermined rule or the content notified from a network resource configuration unit 161 of the network resource control device 125.

Examples of the network resources include a communication band, a time width in a time-division communication method, configuration of a priority for a specific communication type, and the number of communication paths to be used.

Examples of the network resource management unit 151 include the CPU 101, software executed on the CPU 101, and an IC device such as an LSI for network processing in the network relay device.

Figure 8:
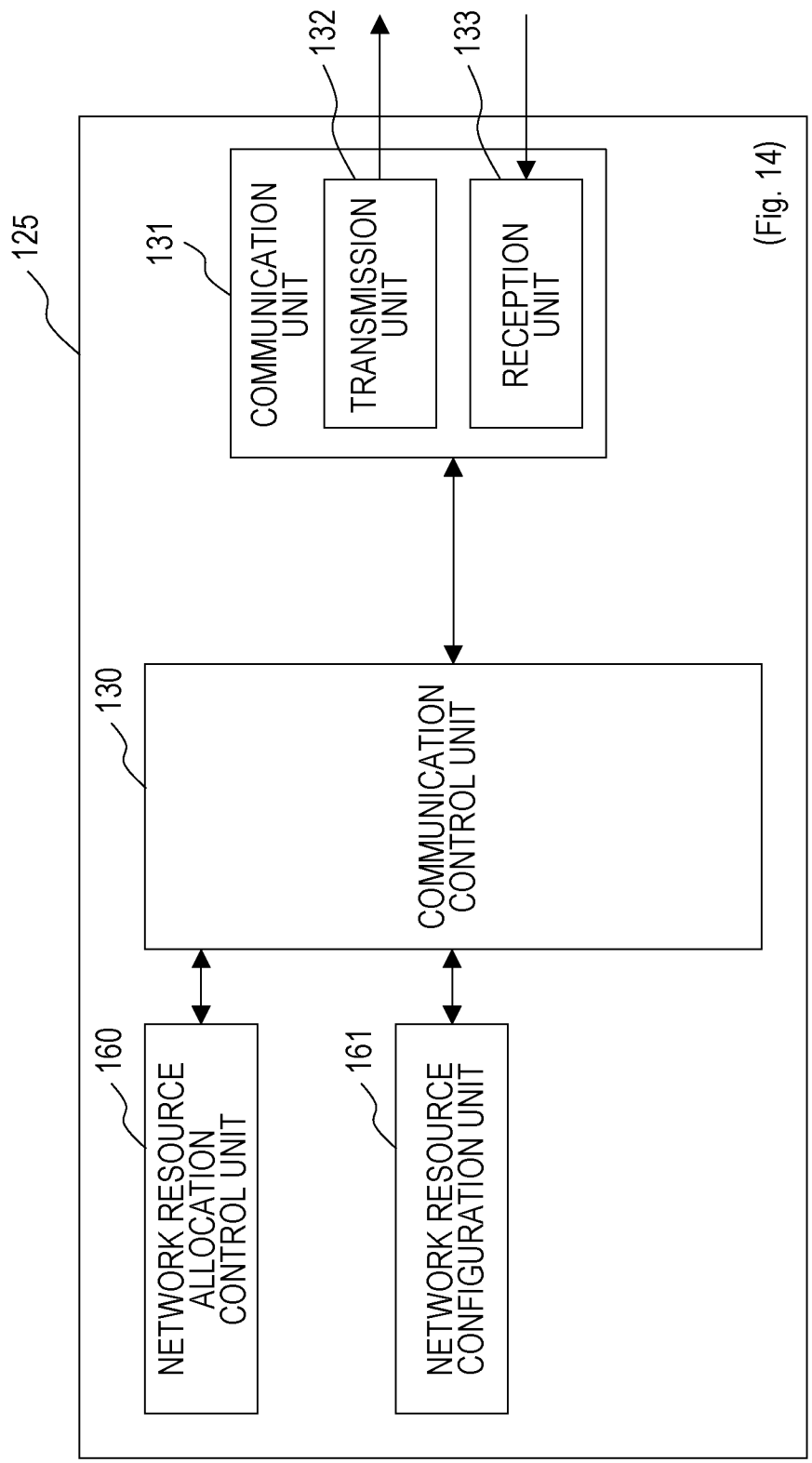
FIG. 8 is a diagram illustrating a functional constitutional example of a network resource control device in FIG. 1.

FIG. 8 illustrates a functional constitution example of the network resource control device 125.

The network resource allocation control unit 160 notifies the network resource management unit 151 of a control content or a change command of the network resources of the network relay device 121 according to the state of the information processing data processing unit 135 notified from the state observation unit 136.

Examples of the network resource allocation control unit 160 include the CPU 101, software executed on the CPU 101, and an IC device such as LSI for network processing.

The network resource configuration unit 161 notifies the network resource management unit 151 of the network relay device 121 of the control content according to control protocol of the network resources based on the control content of the network resources decided by the network resource allocation control unit 160.

Examples of the control protocol of the network resources include OpenFlow, IEEE standards related to TSN, and proprietary protocols.

The proprietary protocol includes at least information related to the type of the network resource to be controlled and information defining how to control. A timing when the control of the network resource is changed or a duration may be included as an absolute time or a relative time. The absolute time may be a time unified within the control system.

Examples of the network resource configuration unit 161 include the CPU 101, software executed on the CPU 101, and an IC device such as an LSI for network processing.

Figure 9:
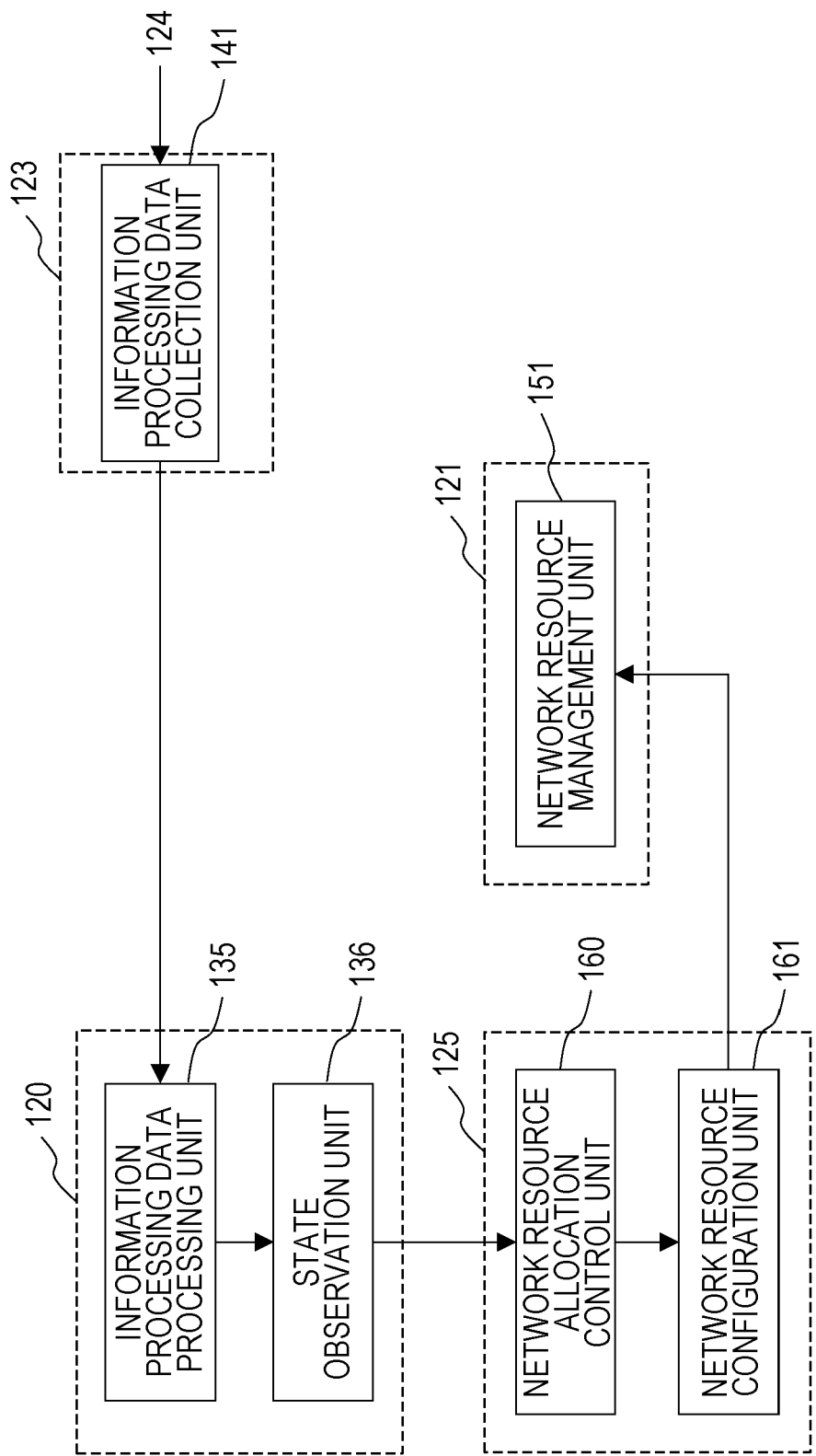
FIG. 9 is a diagram collectively illustrating a relationship between functional units related to control of network resources in FIG. 1.

FIG. 9 illustrates a relationship between the functional units related to the control of the network resources of the present invention.

In FIG. 9, the communication unit 131 that originally present between the functional units is not illustrated.

Although it has been described in the present invention that the information processing data collection unit 141 is included in the distributed control device 123, the information processing data processing unit 135 is included in the central control device 120, the network resource management unit 151 is included in the network relay device 121, the network resource allocation control unit 160 and the network resource configuration unit 161 are included in the network resource control device 125, the arrangement of the functional units is not limited thereto, and the functional units may be differently arranged as long as these function units are included in the control system. For example, the information processing data collection unit 141 may be included in the central control device 120 or the network relay device 121, or the information processing data processing unit 135 may be included in any one or a plurality of devices of the network relay device 121, the distributed control device 123, and the network resource control device 125. The network resource allocation control unit 160 and the network resource configuration unit 161 may be included in any one or a plurality of devices of the central control device 120, the network relay device 121, and the distributed control device 123.

A plurality of network relay devices 121 may be provided, and the network resource allocation control unit 160 and the network resource configuration unit 161 may control the allocation of the network resources to a plurality of network resource management units 151 present in the plurality of network relay devices 121.

The control calculation unit 134, the calculation unit 140, and the information processing data collection unit 141 may add information for deciding the network resources applied by the network relay device 121 to communication data. Examples of this information include VLAN tags defined by IEEE 802.1Q, HSR tags defined by IEC 62439-3, and PRP tags. Examples of the configuration of the VLAN tag include configuration of Priority Code Point (PCP) and VLAN Identifier (VID).

Security measures such as authentication or encryption are applied to the communication of the functional units illustrated in FIG. 9.

Second Embodiment

In the second embodiment, the communication control method executed by using the communication system and the communication control device thereof illustrated in the first embodiment will be described with reference to FIGS. 10 to 15.

Figure 10:
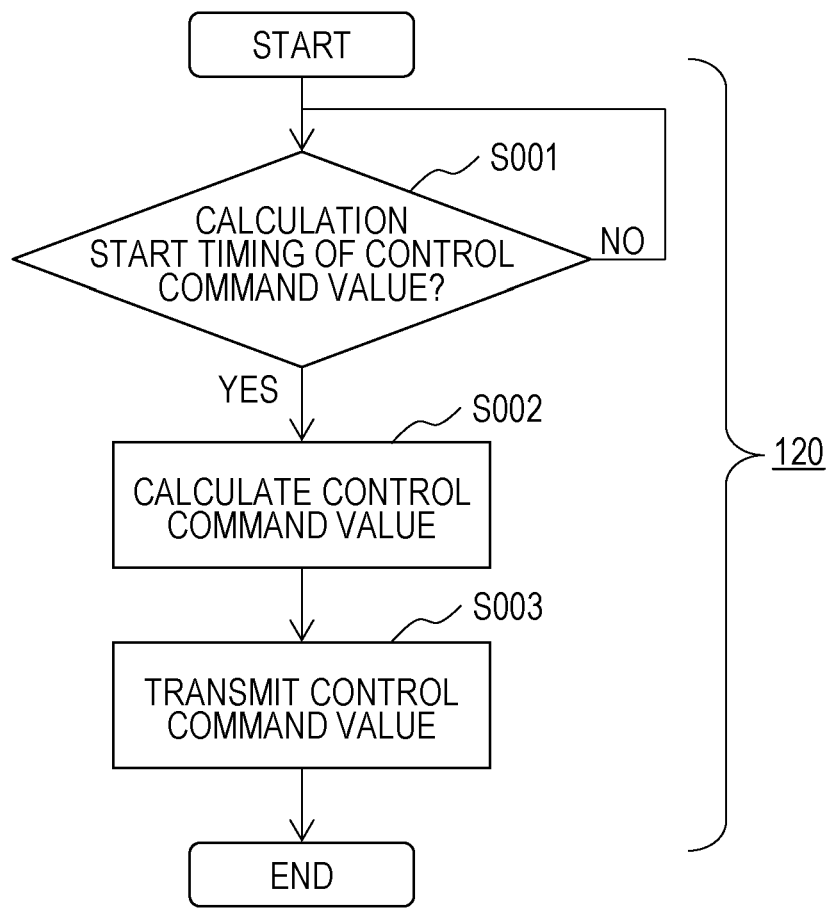
FIG. 10 is a flowchart illustrating an operation procedure of transmission-side control processing in the central control device in FIG. 1.

FIG. 10 illustrates an operation procedure example of transmission-side control processing in the central control device 120. First, the control calculation unit 134 waits for a calculation start timing of the control command value (processing step S001). The control calculation unit may start control processing at a predetermined cycle, may start to calculate the control command in response to the reception of the sensor data or state information of the controlled device 124 from the distributed control device 123 or a start request from another central control device 120.

Subsequently, the control calculation unit 134 calculates the control command value (processing step S002). This calculation is performed according to a predetermined control method. The data received from the distributed control device 123 may be used for calculating the control command value. Subsequently, the calculated control command value is transmitted to the single or plurality of distributed control devices 123 via the communication control unit 130 and the transmission unit 132 (processing step S003).

Figure 11:
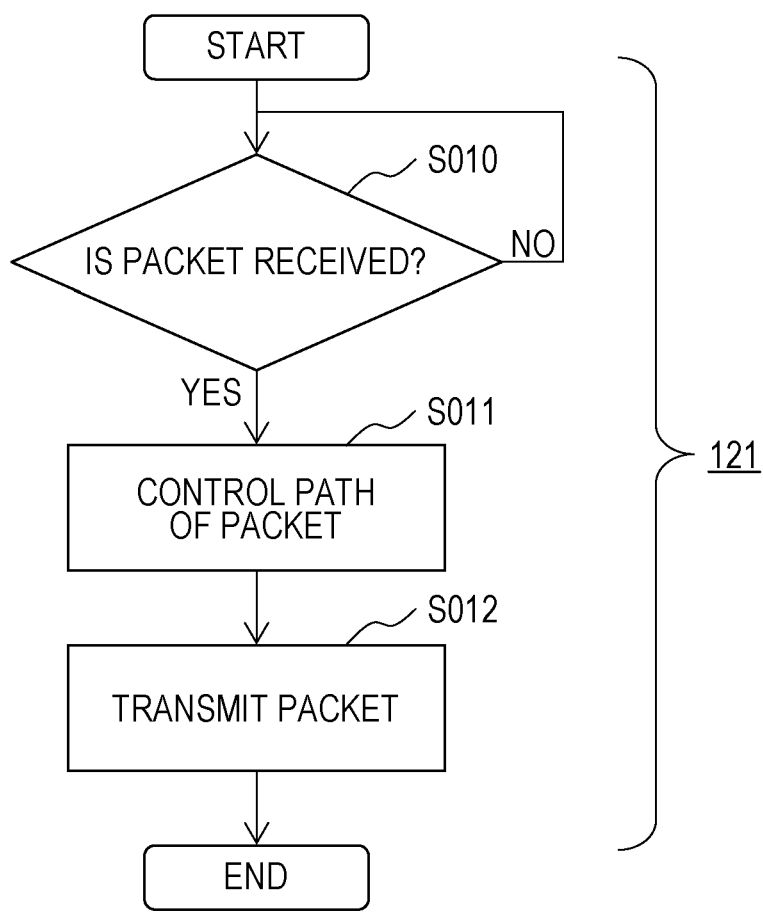
FIG. 11 is a flowchart illustrating an operation procedure of transfer processing in the network relay device in FIG. 1.

FIG. 11 illustrates an operation procedure example of the transfer processing in the network relay device 121. As a premise of the processing in FIG. 11, the control command value transmitted in processing step S003 of FIG. 10 is transferred to the distributed control device 123 according to the procedure illustrated in FIG. 11.

First, the reception unit 133 of the communication unit 131 of the network relay device 121 waits for the reception of the packet (processing step S010). When the packet is received, the communication path control unit 150 decides a transfer timing of the transmission unit 132 of the communication unit 131 that transfers the received packet or a transmission timing of the transmission unit 132 as the transfer destination according to the content of the received packet, the information of the reception unit 133 of the communication unit 131 that receives the packet, and a rule of the path control configured for the communication path control unit 150 by the network resource management unit 151 (processing step S011). At this time, a plurality of transfer destination transmission units 132 may be provided, or may add information to the packet depending on the transmission unit 132 at the time of transfer. The transmission unit 132 that transfers the packet transmits the packet at a timing controlled by the communication path control unit 150 or a timing transferred from the communication path control unit 150 (processing step S012).

Figure 12:
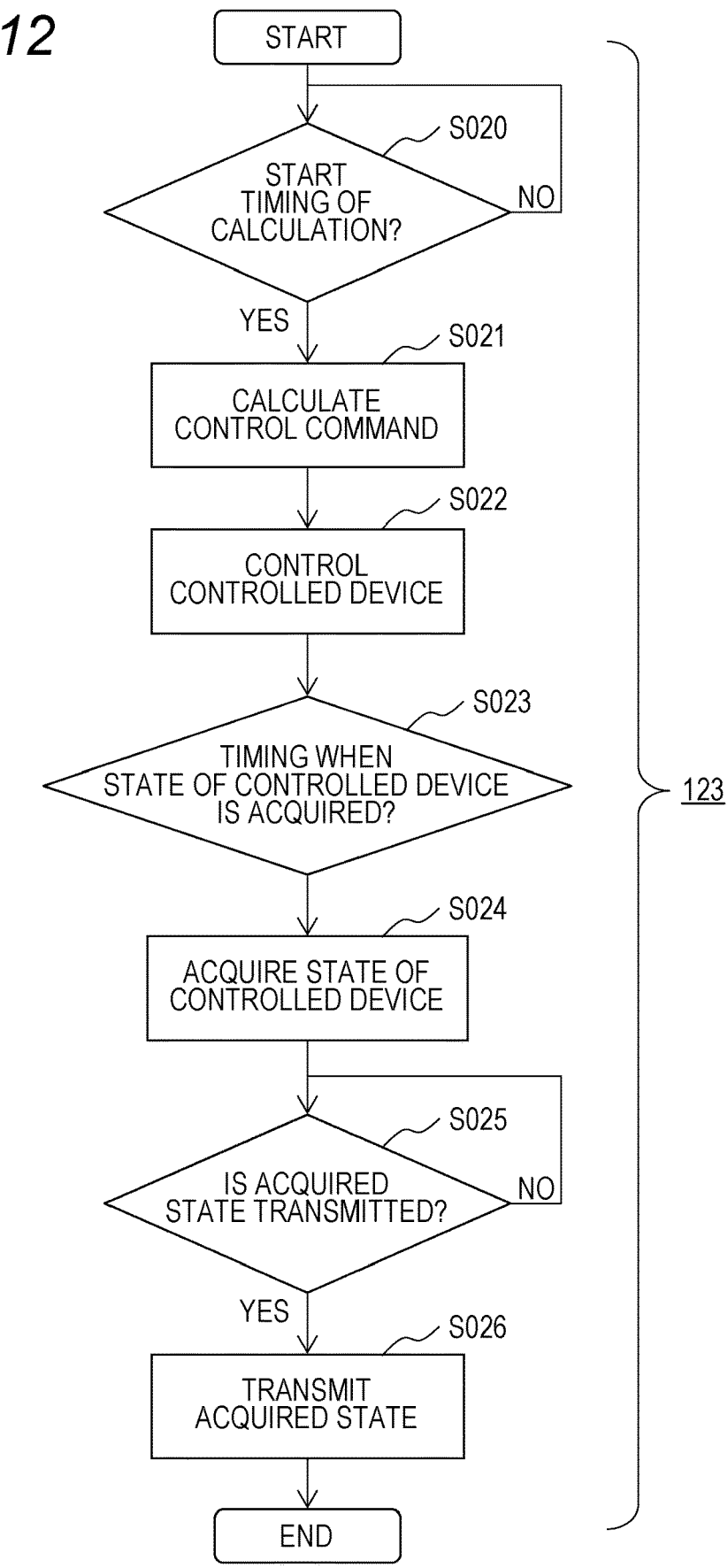
FIG. 12 is a flowchart illustrating an operation procedure of transfer processing in the distributed control device in FIG. 1.

FIG. 12 illustrates an operation procedure example of the control processing in the distributed control device 123.

First, the calculation unit 140 waits for the start of the calculation processing (processing step S020). The calculation unit may start the control processing at a predetermined cycle, or may start when the state of the controlled device 124 is changed.

Subsequently, the calculation unit calculates the control command value of the distributed control device 123 based on the control command value received from the central control device 120 (processing step S021). The controlled device control unit 142 controls the controlled device 124 based on the control command value calculated in processing step S021 (processing step S022). Subsequently, the calculation unit 140 waits for an acquisition timing of the state information and sensor data of the controlled device 124 from the controlled device information acquisition unit 143 (processing step S023). The controlled device information acquisition unit acquires the state information and sensor data of the controlled device 124 (processing step S024). Subsequently, it is determined whether or not to transmit the acquired state information and sensor data of the controlled device 124 to the central control device 120 (processing step S025). When it is determined to transmit the acquired state information and sensor data, the acquired state information and sensor data are transmitted (processing step S026).

The acquired state information and sensor data may be transmitted whenever the state information and sensor data are acquired, or may be transmitted whenever the state information and sensor data are acquired predetermined number of times. Alternatively, the acquired state information and sensor data may be transmitted when the acquired value satisfies a predetermined condition such as comparison of the acquired value with a threshold value. Alternatively, the acquired state information and sensor data may be transmitted at a timing when the state information and sensor data are acquired matches a predetermined condition. Accordingly, for example, it is possible to perform processing such as transmitting only state information and sensor data acquired during the day. Alternatively, the distributed control device 123 or the controlled device 124 may include a plurality of sensors, and the single or plurality of sensors may transmit the state information and sensor data when a predetermined condition is satisfied. Alternatively, the state information and sensor data may be transmitted when the states of the calculation unit 140 and the information processing data collection unit 141 satisfy predetermined conditions. For example, the state information and sensor data may be transmitted when calculation loads of the calculation unit 140 and the information processing data collection unit 141 are small.

For the data to be transmitted, the acquired data may be transmitted with no change, or all of the values acquired multiple times or a result obtained by performing statistical processing on the values may be transmitted. Alternatively, a result obtained by combining with sensor data of other sensors included in the distributed control device 123 and the controlled device 124, or all of the values or a result obtained by performing statistical processing on the values may be transmitted.

After the aforementioned processing is ended, the processing starts again from processing step S020.

Although it has been described that the control processing from processing step S020 to processing step S022, and the acquisition processing of the state information and sensor data from processing step S023 to processing step S026 are sequentially executed, the control processing and the acquisition processing may be executed in parallel.

The acquired state information and sensor data are transmitted to any one or both of the control calculation unit 134 and the information processing data processing unit 135 of the central control device 120. The acquisition processing from processing step S023 to processing step S026 can be executed by any one or both of the calculation unit 140 and the information processing data collection unit 141.

Figure 13:
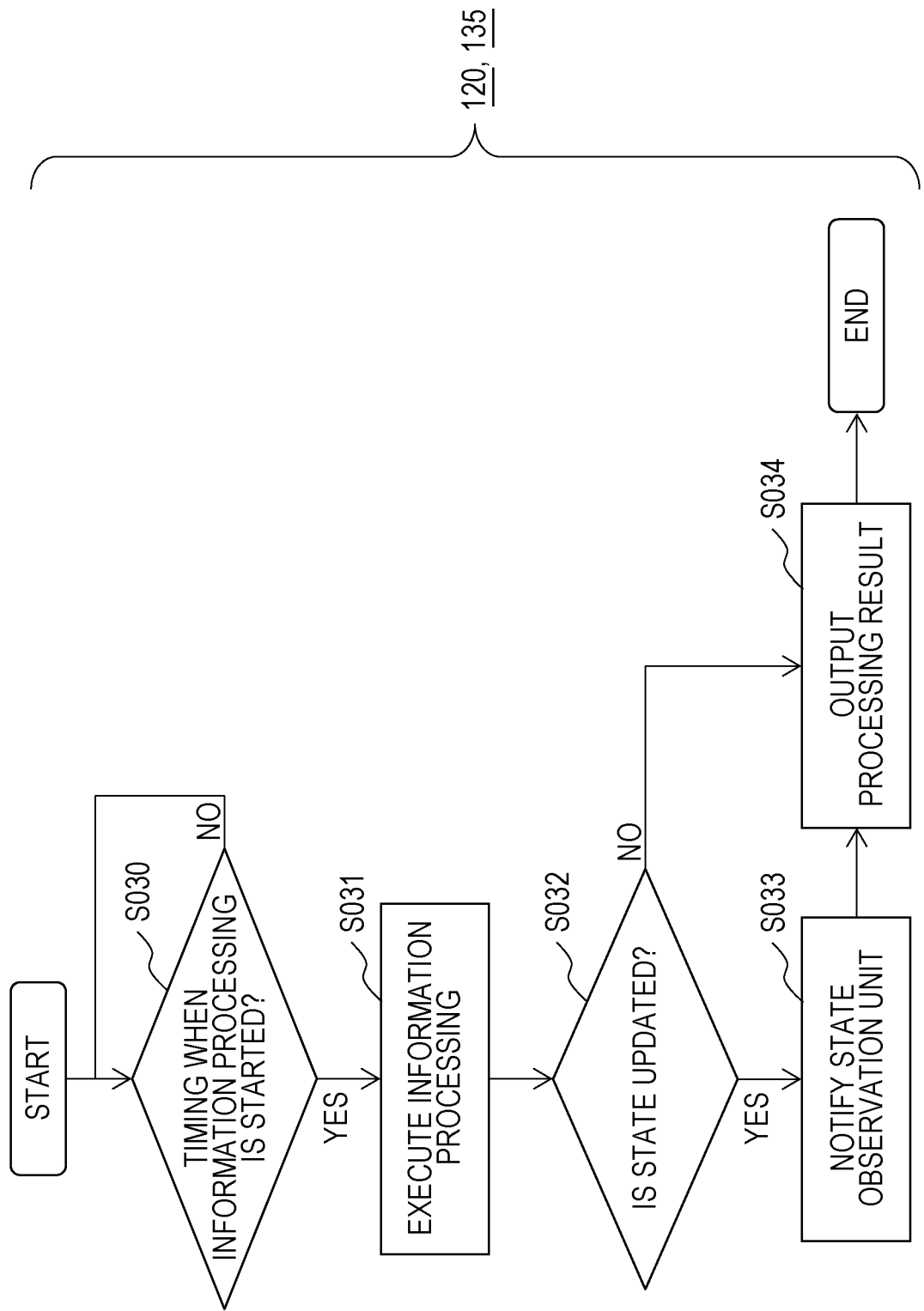
FIG. 13 is a flowchart illustrating an operation procedure of transfer processing in an information processing data processing unit in FIG. 9.

FIG. 13 illustrates an operation procedure example of the information processing data processing unit 135 in FIG. 9. FIG. 13 is a flowchart illustrating an operation procedure of reception-side control processing in the central control device 120.

First, the processing of the information processing data processing unit 135 is waited (processing step S030). This processing may be started when the information processing data from the distributed control device 123 is received or at a predetermined cycle, or may be constantly performed.

Alternatively, this processing may be started according to a start request from another central control device 120. Subsequently, the information processing data processing unit 135 performs calculation by using the information processing data (processing step S031). Subsequently, it is determined whether or not the state of the information processing data processing unit 135 is updated (processing step S032). When it is determined that the state is updated (Y in processing step S032), information of the updated state is notified to the state observation unit 136 (processing step S033). The calculation result of the information processing data is output (processing step S034). The calculation result includes a change in the parameter of the control model for the control calculation unit 134, a calculation result of the application of AI (for example, a result in a classification problem), an abnormality diagnosis result of the controlled device 124 which is a target device in the preventive maintenance. When it is determined that the state is not updated (N in processing step S032), the processing proceeds to processing step S034. In processing step S034, the calculation result may not be output as long as the calculation result is not different from the output result so far.

Figure 14:
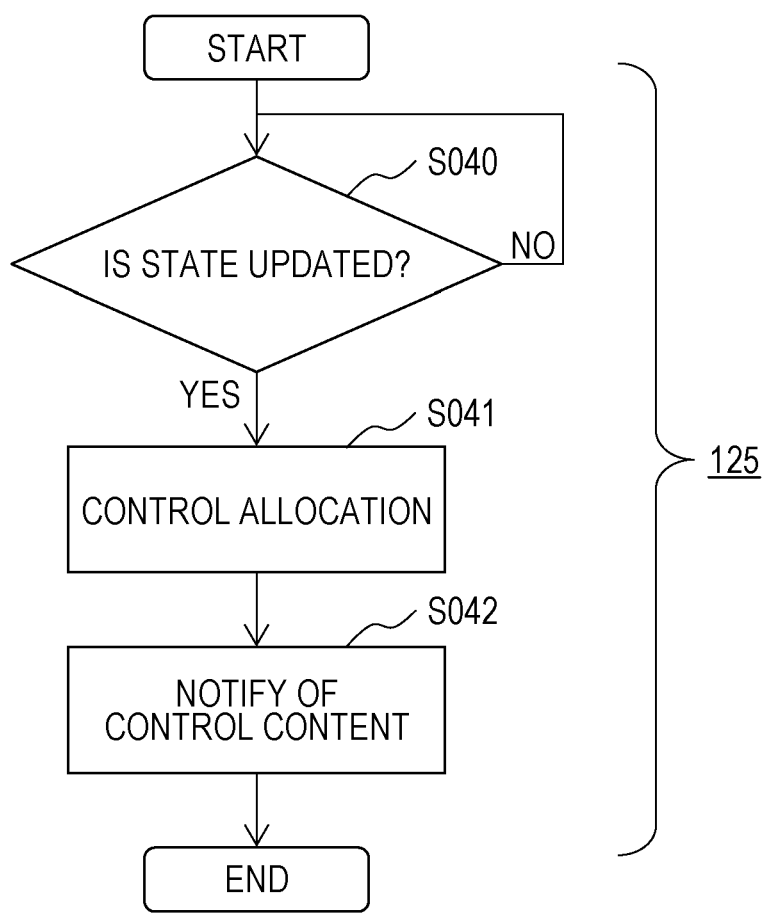
FIG. 14 is a flowchart illustrating an operation procedure of allocation control of the network resources in the network resource control device in FIG. 1.

FIG. 14 illustrates an operation procedure example of allocation control of the network resources in the network resource control device 125.

First, the network resource allocation control unit 160 waits for notification indicating that the state is updated from the state observation unit 136 of the central control device 120 (processing step S040). Subsequently, the allocation of the network resources is controlled (processing step S041). The calculated result is notified to the network resource configuration unit 161, and the network resource configuration unit 161 transmits the allocation result of the network resources to the network resource management unit 151 of the single or plurality of network relay devices 121 (processing step S042). When the allocation result is not changed, the allocation result may not be transmitted.

Figure 15:
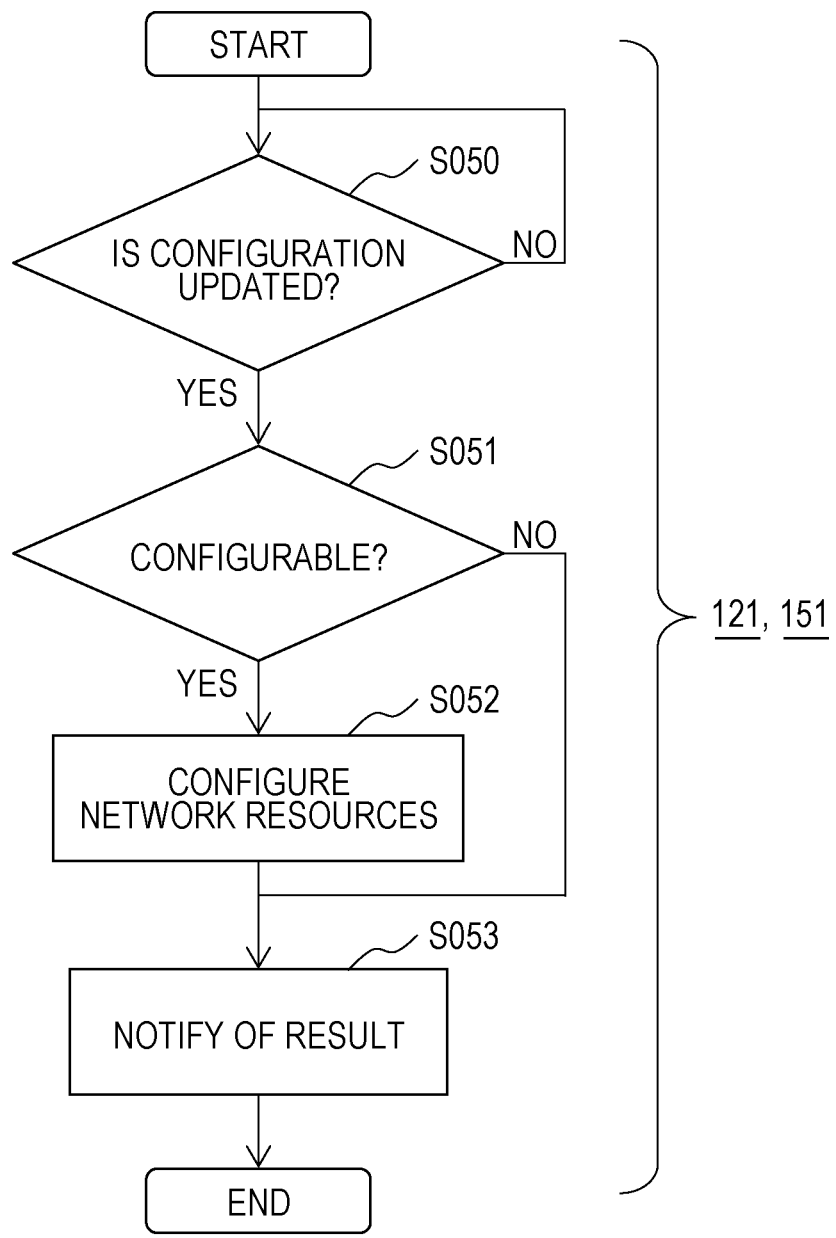
FIG. 15 is a flowchart illustrating an operation procedure of configuration of the network resources by a network resource management unit in the network relay device in FIG. 9.

FIG. 15 illustrates an operation procedure example of configuration of the network resources by the network resource management unit 151 in the network relay device 121.

First, the network resource management unit 151 waits for a timing when the configuration of the communication path control unit 150 is updated (processing step S050). This updating may be started in response to the reception of a configuration command from the network resource configuration unit 161, or may be started at the time of an initial operation after the network relay device is powered on. Alternatively, this updating may be started at a predetermined absolute time or a relative time after the network relay device is activated. Subsequently, it is determined whether or not the configuration content is configurable (processing step S051). In this determination, it is determined whether or not the network relay device 121 has the network resources indicated by the configuration content.

For example, on the assumption that the configuration content is Gigabit Ethernet (Ethernet: registered trademark), even though a communication band greater than 100 Mbps is designated, when the communication unit 131 has the communication band of 100 Mbps in reality, it is determined that the configuration content is unconfigurable. Meanwhile, in the time-division communication method, for example, when a 400-microsecond time slot at a 1-millisecond cycle is not used and the configuration content newly requests allocation of a 200-microsecond time slot, it is determined that the configuration content is configurable. Alternatively, allocation of a 250-microsecond time slot is newly requested, but the resolution of time slots in the communication path control unit 150 and the network resource management unit 151 may be in units of 100 microseconds. In such a case, there are following classifications as correspondences of the communication path control unit 150 and the network resource management unit 151.

A: allocate 200-microsecond time slot (configurable).
B: allocate 300-microsecond time slot (configurable).
C: unconfigurable since resolutions are different.

A and B have a difference in that rounding down or rounding up is performed when the resolutions are different. When the configuration content is configurable (Y) in procedure processing step S051, the network resources are allocated to the network resource management unit 151 (processing step S052). Thereafter, the network resource allocation control unit 160 is notified of whether or not to allocate the network resources and the allocation result (processing step S053). In processing step S053, the result may not be notified, or may be notified only when allocation different from the request is executed such as unallocatable or the difference between the resolutions of the time slots described above.

Next, the understanding of the network constitution will be described.

Since the network resource allocation control unit 160 of the network resource control device 125 controls the allocation of the network resources of the network relay device 121, it is necessary to grasp the topology of the control network 122 constituting the control system and the state and performance of each network relay device 121. The topology of the control network and the state and performance of each network relay device may be input in advance when the control system is started up, or information may be dynamically collected.

Ping (ICMP) and Delay Request Response mechanism of IEEE 1588, Path Cost for constructing a tree topology in IEEE communication standards constituting TSN, Spanning Tree Protocol (STP), and Rapid Spanning Tree Protocol (RSTP), and a routing protocol such as Routing Information Protocol (RIP) are used for collecting the information.

Alternatively, the proprietary protocol may be used for collecting the information. The proprietary protocol includes a type of the network resources manageable by the network relay device 121, a range of a configurable value, a configuration of a parameter, and a current configuration state.

Third Embodiment

In the third embodiment, the network resources in the network and an adjustment method thereof will be described.

Although it has been described in the first and second embodiments that the resources are simply referred to as the network resources, some resources are considered as the network resources adjustable in the present invention. The network resources available in the present invention include, for example, any one or more of a time slot in the time-division communication system, a communication band, a priority of the packet transmission or reception, the number of paths to be used in redundant communication or the number of duplicated packets, and the size or number of datagrams constituting the packet. Hereinafter, the specific contents of the network resources will be described in more detail.

First, a case where the time slots in the time-division communication method are focused as the network resources will be described.

In FIGS. 1 to 9, the time slots in the time-division communication method are used as the network resources which are the targets of the network resource allocation control unit 160, the network resource configuration unit 161, the communication path control unit 150, and the network resource management unit 151. In this case, the time width of the time slot may be changed, or the number of time slots to be used may be changed. A gate control list of IEEE 802.1Qbv, and Communication Profile Family 3 and Communication Profile Family 13 of IEC 61784-2 are used. In this manner, it is possible to improve utilization efficiency of the control network 122 according to the processing procedure of the information processing data processing unit 135 while ensuring real-time properties in the existing control communication.

Next, a case where the communication bands are focused as the network resources will be described. Examples of the network resources which are the targets of the network resource allocation control unit 160, the network resource configuration unit 161, the communication path control unit 150, and the network resource management unit 151 include allocation of communication bandwidths, assignment of a priority in IEEE 802.1Q, the number of channels of a radio frequency band, and the number of changes to be used.

Next, a case where the priority of the packet transmission or reception as the network resource and the redundant communication will be described. Here, examples of the network resource include the priority of the packet transmission or reception, the number of used paths in the packet path control using a plurality of paths in the redundant communication, and the number of duplicated target packets even in one communication path.

The same communication content is retransmitted, and thus, communication can be redundant. Accordingly, it is possible to achieve high reliability. In this case, it is useful to control the allocation of network resources related to retransmission. Specifically, examples of the network resources related to the retransmission include an occupation time of the communication unit 131, calculation resources of the control calculation unit 134, the calculation unit 140, the information processing data collection unit 141, and the communication path control unit 150 related to the retransmission, storage resources for storing the packets, and the number of times of the retransmission.

At this time, when the packet transmitted from the calculation unit 140 or the information processing data collection unit 141 is duplicated, high reliability may be achieved by transmitting the packets different central control devices 120.

Alternatively, the information processing data is transmitted to the plurality of central control devices 120 that operates AI using different learning methods from the distributed control device 123, and thus, the learning methods are diversified. As a result, it is possible to obtain advantages that a possibility that learning will be converged is improved, a learning speed is improved, and learning is advanced by using a council system of multiple AIs.

Examples of other network resources include security resources for communication. Examples of other network resources include allocation of encryption calculation engines.

Alternatively, examples of the network resources include the data size of a single or a plurality of datagrams constituting an IEEE 802.3 frame or the number of datagrams. For example, since the data area can be constituted by the plurality of datagrams, EtherCAT corresponds thereto.

It is considered that continuity and discontinuity of the allocation of the network resources and the configuration time are adjusted. The allocation and assignment of the network resources may not be necessarily continuous. For example, when the number of time slots in the time-division communication method is changed, the time slots to be added may not be continuous in time.

A period for which the change of the network resources is maintained may be continued until the network resources are changed again after the network resources are changed, or may be valid only for a predetermined period or until a predetermined time. The predetermined period may be configured as a period after the change is instructed, or a predetermined period such as from 18:00 to 24:00 during the day may be designated.

At the time of managing the network resources, as a specific change amount, the network resource management unit 151 may decide a predetermined change amount for each state defined by the state observation unit 136, or the change amount may be dynamically adjusted and controlled.

Fourth Embodiment

In the fourth embodiment, the condition for controlling the allocation of the network resources in the procedure of processing the collected information will be described in detail. The state to be observed is checked by the state observation unit 136 in the central control device 120 in FIG. 9, and it is determined whether or not the state is a state in which the network resource allocation control unit 160 within the network resource control device 125 needs to execute the control of the network resources based on the checked state. The following conditions will be described below.

AI may be considered as the method of the allocation control according to the present invention. As this premise, for example, the central control device 120 includes an AI function, collects a large amount of data through communication, and applies the AI processing result to the control and monitoring.

As the allocation control of the network resource management unit 151, influence factors on a predetermined event are specified by applying AI or statistical processing in the central control device 120. In the AI and statistical processing in the central control device 120, for example, when degrees of abnormality and deterioration of equipment, devices, and consumables are estimated, since a large number and various types of sensor data are acquired through communication at an initial stage of the AI and statistical processing, many network resources such as time slots are allocated.

Meanwhile, in the AI and statistical processing, when the influence factors such as the degrees of abnormality and deterioration can be specified, since only the sensor data related to the influence factors may be acquired, the network resources can be limited. At this time, examples of the network resources to be allocated include assignment of the network resources capable of communicating all the sensor data at the initial stage and assignment of the network resources capable of communicating only necessary sensor data after the influence factors are specified.

Figure 18:
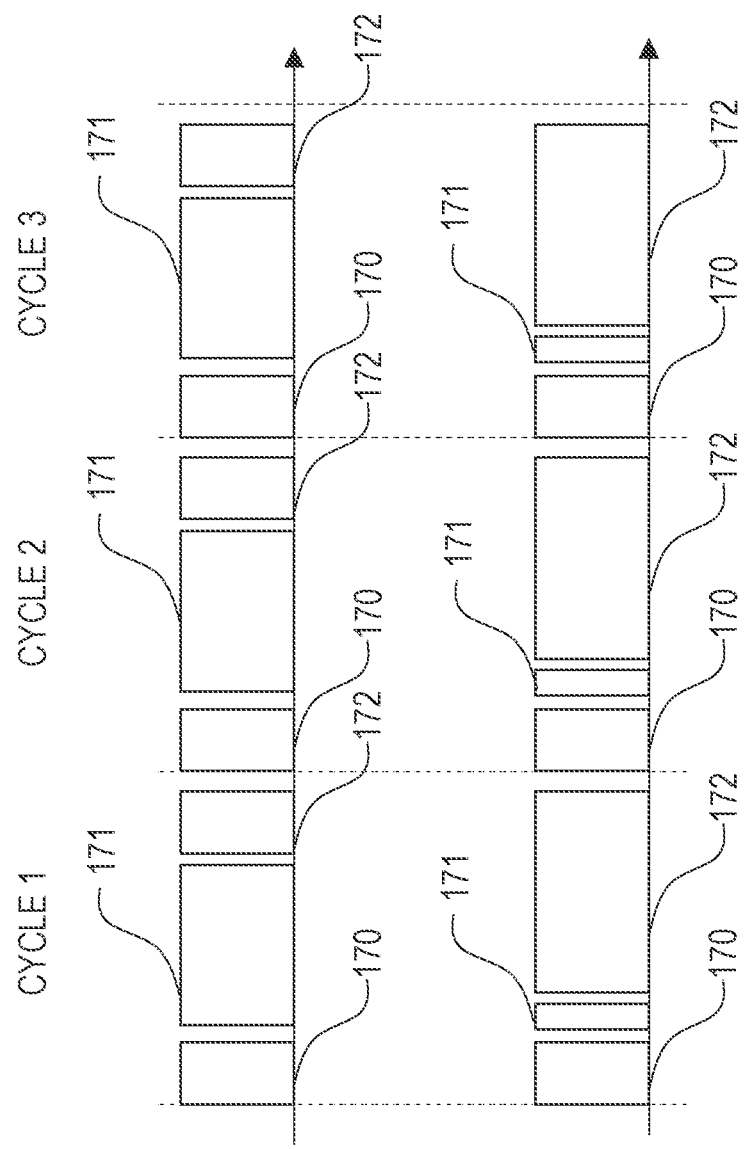
FIG. 18 is a diagram illustrating a change of the allocation of the network resources in the network relay device in FIG. 1.

For example, time slots are assigned to three types of communication for each cycle in FIG. 18. When a time slot 190 is used for communication of control data, a time slot 191 is used for communication of sensor data, and a time slot 192 is used for communication of other data, a time slot width capable of communicating all sensor data is allocated to the time slot 191 at the initial stage of FIG. 18, and a time slot width capable of communicating only necessary sensor data is allocated to the time slot 191 after the influence factors are specified of FIG. 18.

Figure 19:
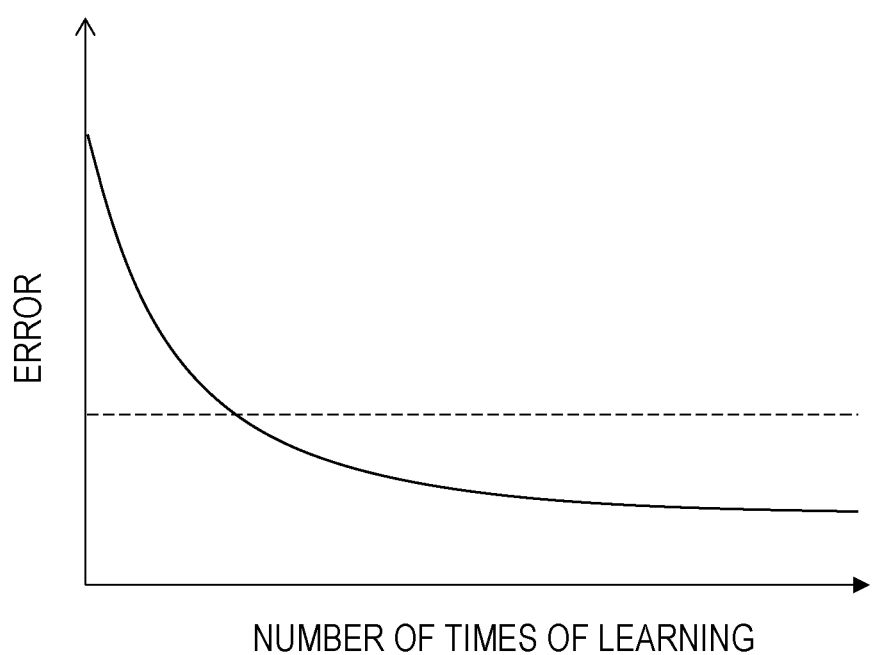
FIG. 19 is a diagram illustrating an index for controlling the allocation of the network resources in the network relay device in FIG. 1.

When supervised learning method of AI is applied, two states of a state of a learning stage and a state of an inference stage are used as the state of the network resource management unit 151. Alternatively, a value of an error function representing a difference between teacher data and an inference result may be used as the state. The value of the error function itself may be used, or the error function may be divided into several ranges, and the state may be expressed by a difference between the ranges. FIG. 19 illustrates a learning curve, and illustrates that the state is changed when an error is less than, for example, a predetermined threshold value (dotted line in FIG. 19). Alternatively, when a differential value of a change of the error is less than a predetermined threshold value, it may be considered that learning is converging, and the state may be changed.

At this time, at the inference stage, the inference result is transmitted from the central control device 120 to the distributed control device 123, and the network resources allocated to the communication of the sensor data from the distributed control device 123 are limited in this case.

Alternatively, the state may be identified by a degree of change of the parameter in a neural network or each estimation method. For example, when a degree of change of a weighting factor of each neuron in the neural network is equal to or less than a predetermined value, it is considered that the leaning is converged, and a state in which the learning is ended is considered. Other states may be used as the learning state, and a plurality of states may be defined according to the degree of change of the weighting factor.

Alternatively, when a virtual machine that constitutes a control cloud on the control system and realizes the control system moves to a different central control device 120 or distributed control device 123, the network resources are changed. Specifically, the allocation of the network resources on the path connecting the central control device 120 and the distributed control device 123 before the virtual machine is moved is reduced, and the allocation of the network resources on the path connecting the distributed control devices 123 that connect the central control device 120 or the distributed control device 123 which is a movement destination and the controlled device 124 as the control target is increased.

As the method of the allocation control, maintenance and accidents may be considered. For example, when the related equipment and device fails, since communication of operation data and sensor data for factor investigation is prioritized, the network resources are allocated to the communication of the information processing data.

Alternatively, when a production volume at night is small in a production system of a factory, a Factory Automation (FA) system, and a Process Automation (PA) system, the allocation of the network resources for communication related to the production from the central control device 120 to the distributed control device 123 or from the distributed control device 123 to the central control device 120 is reduced, whereas the allocation of the network resources to the information processing data mainly including diagnostic data for preventive maintenance is increased. In such a case, the network resource management unit 151 acquires information on a target control system in cooperation with SCADA, DCS, and Manufacturing Execution System (MES).

Time synchronization may be considered as the method of the allocation control. In the time-division communication method, a predetermined time slot may be allocated to a network time synchronization protocol such as Network Time Protocol (NTP), Simple Network Time Protocol (SNIP), IEC 61158, or IEEE 1588, and the information processing data processing unit 135 of the central control device 120 may evaluate synchronization accuracy with the distributed control device 123, and may change the time width of the time slot of the time synchronization packet or the number of times according to a correction amount in the distributed control device 123. For example, when the amount of time correction in the distributed control device 123 is small, it is considered that a time difference with a device (for example, the central control device 120, another distributed control device 123, or the network relay device 121) which is a reference for time synchronization is approximated, the network resources of the time synchronization packet are reduced.

Fifth Embodiment

In the fifth embodiment, the utilization of the surplus resources as various items accompanying the present invention will be described with reference to FIGS. 16 and 17.

According to the fourth embodiment, the network resources may be in surplus by adjusting the network resources.

For example, when the allocation of the network resources is reduced according to the processing procedure of the information processing data processing unit 135, the surplus network resources can be used for other purposes.

For example, it is possible to apply a multimodal AI by adding different types of sensors to the distributed control device 123 or the controlled device 124, and AI learning is advanced.

Alternatively, the format and expression format of information to be transmitted are changed. For example, data transmitted as binary (0, 1) in the related art is changed to a numerical value. For example, when a temperature sensor is used as an example, a specific temperature value is changed from an expression of 0 or 1 indicating whether a temperature is equal to or greater than 20 degrees.

Alternatively, for example, when a sensing target is expressed by a combination of sine waves, the Fourier transform or phasor display of the signal is normally performed, and the parameters are transmitted at a predetermined cycle, an instantaneous value is transmitted at a shorter cycle due to the surplus network resources.

Alternatively, for example, when determination results of rough classifications such as normal, abnormal, safe, and danger states are usually transmitted, the determination results together with the determination reason (for example, the determination based on the sensor value) are transmitted, or measures of the abnormal and danger states are transmitted due to the surplus network resources.

In the utilization of the surplus resources, the usual communication content (for example, 0 or 1 indicating whether or not the temperature is equal to or greater than 20 degrees) is communicated in the allocated network resource, and specific information (temperature value) is communicated in the surplus resource.

The allocation may be reconfigured. The allocation of the network resources is reconfigured in response to a predetermined event.

For example, when a seasonal tendency change is expected in the target control system, the reconfiguration is performed according to the season. For example, the allocation of the network resources for predetermined sensor data is increased at a specific date and time.

Alternatively, the allocation of the network resources may be reconfigured by considering that the state of the control system is abnormal or is changed when an abnormal change is observed in the sensor value including the distributed control device 123 different from the target. Such a change may be determined by comparing the sensor value with a predetermined threshold value, or may be determined based on the degree of change of the sensor value with time.

Alternatively, when a social infrastructure sensor such as a bridge sensor and a river flow meter sensor is used, the allocation of the network resources may be reconfigured in response to the occurrence of natural disasters such as earthquakes, typhoons, heavy rains, storms, extreme heat, and high humidity.

Alternatively, in the control system such as FA or PA, the allocation of the network resources may be reconfigured by changing, rapidly increasing or drastically decreasing the production volume, newly providing, adding, or reducing production lines, or introducing and updating of new facilities, discarding existing facilities, and adding or updating new sensors.

Alternatively, when the supervised learning method is executed in the information processing data processing unit 135, the error function may be periodically evaluated after the learning is converged, and the allocation of the network resources may be reconfigured according to the comparison result of the value with a predetermined threshold value.

When an environment of the control system is dynamically changed, it is possible to follow a change of the environment of the control system by continuing the learning, and it is possible to advance the information processing data processing.

The present invention may be applied to a field control system connected to the distributed control device 123 via a field bus by using a control computer adopting a fanless processor, a Graphics Processing Unit (GPU), or an AI processing IC for an embedded system.

Figure 16:
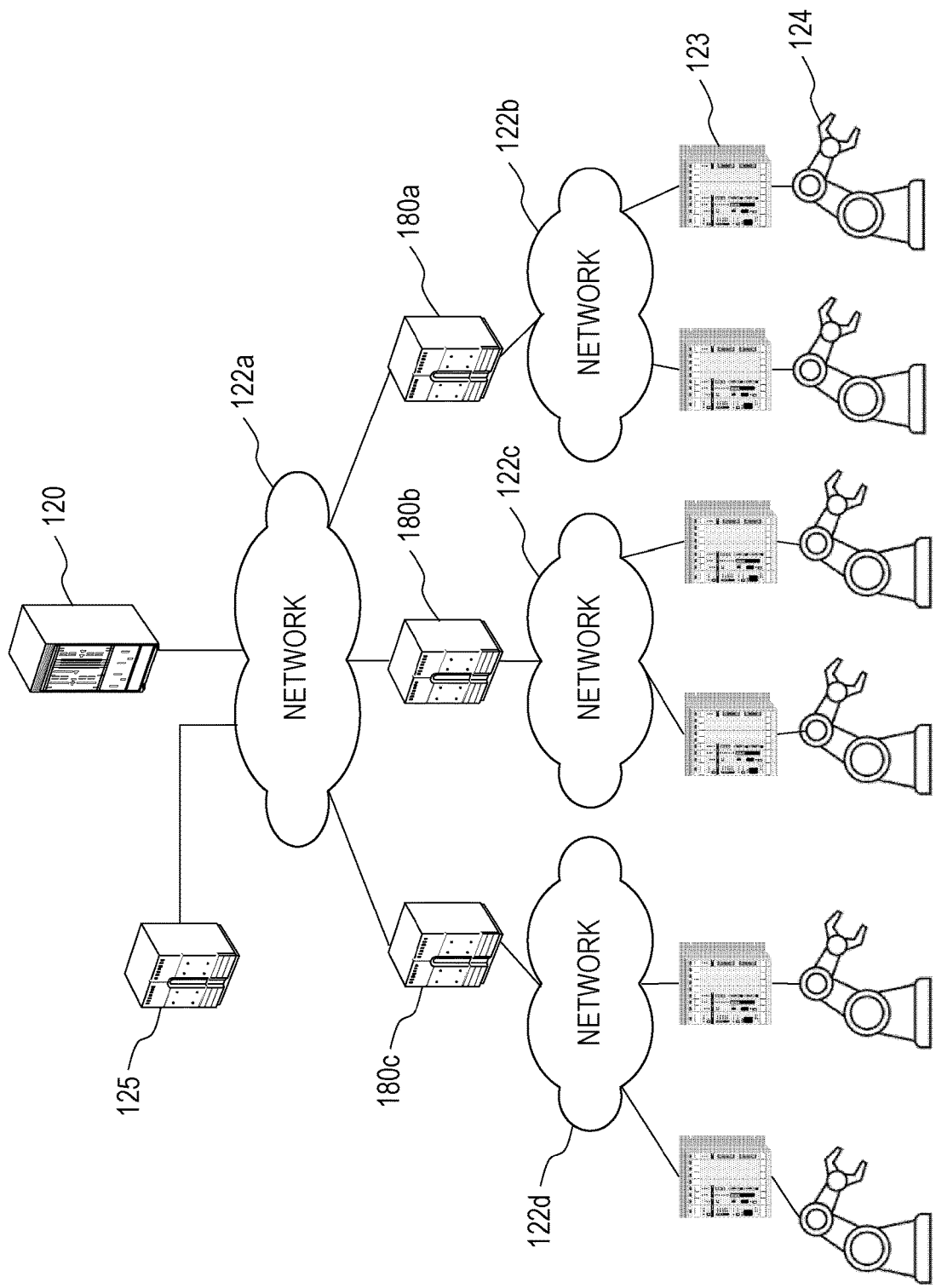
FIG. 16 is a diagram illustrating an example of a system constitution when the network constitution is hierarchized.
Figure 17:
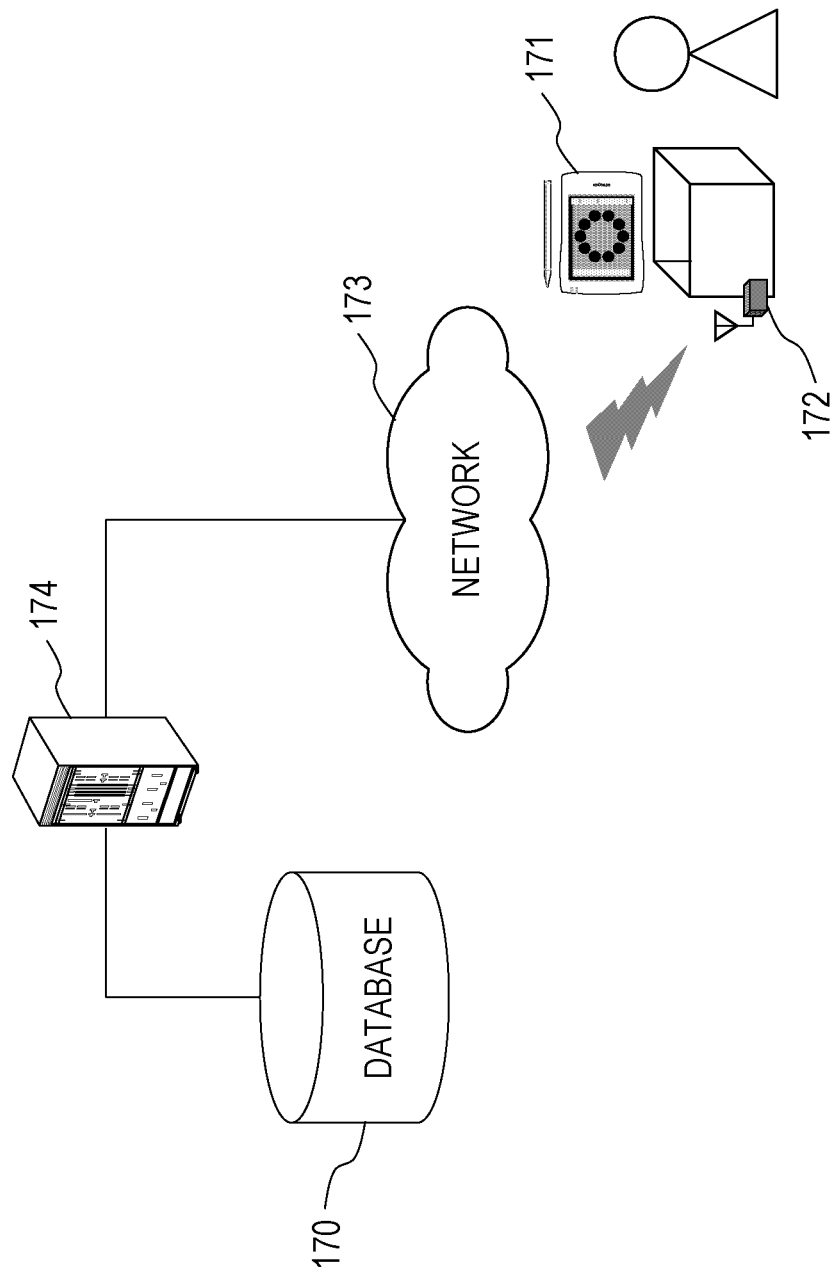
FIG. 17 is a diagram illustrating a system constitutional example when the present invention is applied in a supermarket, a department store, or a shopping store.

Alternatively, as illustrated in FIG. 16, when the network constitution is hierarchized, communication control devices 180 may detect the states of the lower control networks 122, may notify the information processing data processing unit 135 of the central control device 120, and may control different lower control networks 122.

For example, when the state of the distributed control device 123 connected to a control network 122b is changed and the importance of the sensor data of the distributed control device 123 in the central control device 120 is increased (for example, accident or abnormality), in the control network 122a and 122b, the allocation of the network resources for the distributed control devices 123 connected to the control network 122b is increased, and the allocation of the network resources for the distributed control devices 123 connected to the control networks 122c and 122d or the control networks 122c and 122d of the control network 122a is decreased. At this time, the communication control devices 180a, 180b, and 180c have the same constitution as the constitution of the central control device 120 illustrated in FIG. 5.

The communication control devices 180a, 180b, and 180c receive a change request of the network resources from the central control device 120, and update the network resources of the lower control networks 122. Alternatively, the communication control devices 180 may autonomously update the network resources.

Although it has been described that the network resource allocation control unit 160 of the network resource control device 125 controls the allocation of the network resources of the network relay device 121, the same network resources may be controlled by the central control device 120 and the distributed control device 123.

Although it has been described that the present invention is applied to the control systems, the present invention is not limited thereto. For example, FIG. 17 illustrates an example in which the present invention is applied to a supermarket, a department store, or a shopping store. A tablet PC 171 is provided at a cart or a shopping basket of a customer, an identifier of the customer or a product within the cart or the shopping basket is transmitted to a central device 174 through wireless communication provided at the cart or the shopping basket, and characteristics of the customer are learned or inferred by the information processing data processing unit 135 in the central device 174 by using information of a past purchase history stored in the database 170.

The allocation of the network resources of a network 173 is changed according to the learning stage. After the characteristics of the customer are learned, data related to an advertisement and guidance for the product that may be similar or interested from a purchase tendency of the customer is transmitted to the tablet PC 171 by using the surplus resources, and is displayed.

The recognition of the purchased product is automatically performed by inputting the purchased product to the tablet PC 171 or adding a radio frequency identifier (RFID) tag to the product.

With the aforementioned constitution, since the network resources of the central control device 120, the distributed control device 123, and the network relay device 121 are appropriately allocated according to the processing procedure of the information processing data, it is possible to improve utilization efficiency of the network resources. When the time slots of the time-division communication method are used as the network resources, it is possible to apply AI or the maintenance of CBM to the control system while ensuring the real-time properties of the control command, and it is possible to advance the control system.

The network resources are appropriately changed according to the state of the information processing data processing unit 135, and thus, advancement through the redundant communication, acceleration of the AI learning using a different type of AI, the advancement through the council system, and advancement of an operation of the control system through supplementary information and refinement of the sensor data are expected by using the surplus resources.

The allocation of the network resources is reconfigured according to a predetermined event, and thus, the control system can be adapted according to the environmental change.

What is claimed is:

1. A communication control device of a communication system that collects information of a first control device in a second control device via a relay device on a network, the communication control device, comprising:
a processor coupled to the second control device via the network,
wherein the processor is programmed to allocate network resources of the network based on a stage of a procedure of processing the collected information which includes applying artificial intelligence (AI) functions to the collected information by the second control device, wherein the network resources include a communication cycle, which includes a first time slot, a second time slot for sensor data and a third time slot, wherein the application of the AI includes a learning stage, as a first stage, in which a learning method is applied and a second stage, wherein information is communicated in the cycle during the learning stage and a value of an error function is calculated that represents a difference between teacher data and an inference result and upon determining the value of the error function is less than a predetermined value, the second time slot for the sensor data of the communication cycle is changed to be less than the second time slot for the sensor data of the communication cycle during learning stage.

2. The communication control device according to claim 1, wherein the network resources are the network resources on a communication system constituted by the first control device, the second control device, the relay device, and the network.

3. The communication control device according to claim 1, wherein the network resource is one or more of the first time slot, the second time slot for sensor data, the third time slot in a time-division communication method, a communication band, a priority of transmission or reception of a packet, the number of paths used for redundant communication or the number of duplicated packets, and a size of a datagram constituting the packet or the number of datagrams.

4. The communication control device according to claim 2, wherein any of the allocated network resources to be applied is selected by using information on the packet.

5. The communication control device according to claim 1, wherein the procedure of processing the collected information is one or more of the procedure of AI learning or statistical processing in the second control device, a procedure of investigation processing of a change factor performed by the second control device when a state of the first control device is changed, a procedure of time synchronization processing between the second control device and the first control device, and a state machine in the second control device.

6. The communication control device according to claim 1, wherein, in the allocation of the network resources of the network, surplus resources generated by decreasing the network resources for a first communication purpose are allocated for a second communication purpose.

7. The communication control device according to claim 6, wherein the second communication purpose is communication between the first control device or the second control device and a third control device.

8. The communication control device according to claim 6, wherein the second communication purpose is communication of information obtained from a second sensor by connecting the second sensor in addition to a first sensor connected to the first control device.

9. The communication control device according to claim 6, wherein the second communication purpose is communication of another expression of information obtained from a first sensor connected to the first control device.

10. A communication system comprising:
a first control device;
a relay device that relays information of the first control device on a network;
a second control device that collects the information of the first control device via the relay device; and
a communication control device, coupled to the second control device via the network and including a processor programmed to:
control allocation of network resources of the network based on a stage of a procedure of processing the collected information which includes applying artificial intelligence (AI) functions to the collected information by the second control device,
wherein the network resources include a communication cycle, which includes a first time slot, a second time slot for sensor data and a third time slot,
wherein the application of the AI includes a learning stage, as a first stage, in which a learning method is applied and a second stage,
wherein information is communicated in the cycle during the learning stage and a value of an error function is calculated that represents a difference between teacher data and an inference result and upon determining the value of the error function is less than a predetermined value, the second time slot for the sensor data of the communication cycle is changed to be less than the second time slot for the sensor data of the communication cycle during learning stage.

11. The communication system according to claim 10, wherein the relay device, the first control device, and the second control device transmit execution results of the allocation control of the network resources to the communication control device.

12. The communication system according to claim 10, wherein the allocation control of the network resources is executed based on a change of a constitution of the communication system constituted by the relay device, the first control device, and the second control device.

13. The communication system according to claim 10, wherein the allocation control of the network resources is executed based on a change of an environment in which the second control device is provided.

14. A communication control method of a communication system that collects information of a first control device in a second control device via a relay device on a network, the method comprising:
controlling allocation of network resources of the network based on a stage of a procedure of processing the collected information which includes applying artificial intelligence (AI) functions to the collected information by the second control device,
wherein the network resources include a communication cycle, which includes a first time slot, a second time slot for sensor data and a third time slot,
wherein the application of the AI includes a learning stage, as a first stage, in which a learning method is applied and a second stage,
wherein information is communicated in the cycle during the learning stage and a value of an error function is calculated that represents a difference between teacher data and an inference result and upon determining the value of the error function is less than a predetermined value, the second time slot for the sensor data of the communication cycle is changed to be less than the second time slot for the sensor data of the communication cycle during learning stage.

15. The communication control method according to claim 14, wherein the network resources are the network resources on a communication system constituted by the first control device, the second control device, the relay device, and the network.

16. The communication control method according to claim 14, wherein the network resource is one or more of the first time slot, the second time slot for sensor data, the third time slot in a time-division communication method, a communication band, a priority of transmission or reception of a packet, the number of paths used for redundant communication or the number of duplicated packets, and a size of a datagram constituting the packet or the number of datagrams.

17. The communication control method according to claim 15, wherein any of the allocated network resources to be applied is selected by using information on the packet.

18. The communication control method according to claim 14, wherein the procedure of processing the collected information is one or more of a the procedure of AI learning or statistical processing in the second control device, a procedure of investigation processing of a change factor performed by the second control device when a state of the first control device is changed, a procedure of time synchronization processing between the second control device and the first control device, and a state machine in the second control device.

* * * * *